(12) United States Patent
Staring et al.

(10) Patent No.: US 11,955,811 B2
(45) Date of Patent: Apr. 9, 2024

(54) WIRELESS INDUCTIVE POWER TRANSFER

(71) Applicant: KONINKLIJKE PHILIPS N.V., Eindhoven (NL)

(72) Inventors: Antonius Adriaan Maria Staring, Eindhoven (NL); Andries Van Wageningen, Wijlre (NL)

(73) Assignee: Koninklijke Philips N.V., Eindhoven (NL)

( * ) Notice: Subject to any disclaimer, the term of this patent is extended or adjusted under 35 U.S.C. 154(b) by 74 days.

(21) Appl. No.: 17/227,417

(22) Filed: Apr. 12, 2021

(65) Prior Publication Data

US 2022/0029474 A1 Jan. 27, 2022

Related U.S. Application Data

(63) Continuation of application No. 16/068,809, filed as application No. PCT/EP2017/050169 on Jan. 5, 2017, now Pat. No. 10,985,613.

(30) Foreign Application Priority Data

Jan. 13, 2016 (EP) ..................... 16151007

(51) Int. Cl.
*H02J 50/12* (2016.01)
*H01F 27/28* (2006.01)
*H02J 50/80* (2016.01)

(52) U.S. Cl.
CPC .............. *H02J 50/12* (2016.02); *H01F 27/28* (2013.01); *H02J 50/80* (2016.02)

(58) Field of Classification Search
CPC ............ H02J 50/80; H02J 50/12; H01F 27/28
(Continued)

(56) References Cited

U.S. PATENT DOCUMENTS 9,685,824 B2 6/2017 Ijima et al.
2012/0098351 A1 4/2012 Ross
(Continued)

FOREIGN PATENT DOCUMENTS

EP 2958247 A1 12/2015
JP 2014207795 A 10/2014
(Continued)

OTHER PUBLICATIONS

Wireless Power Consortium, Qi Specification, Accessed Jul. 9, 2018.
(Continued)

*Primary Examiner* — Daniel Cavallari
*Assistant Examiner* — Dru M Parries

(57) ABSTRACT

A power transmitter (101) of a wireless power transfer system comprises a resonance including a transmitter coil (103) for generating a power transfer signal for wirelessly transferring power to a power receiver (105). Further, a driver (1303) generates a drive signal for the resonance circuit (201) and a message receiver (1305) is arranged to receive messages from the power receiver (105). A power loop controller (1307) implements a power control loop by adapting the power of the drive signal in response to power control messages received from the power receiver (105). However, the regulation is subject to a constraint of at least one of a current or voltage of the resonance circuit and a power of the drive signal being below a maximum limit. Further, the power transmitter (101) comprises an adapter (1309) which adapts the maximum limit in response to a load indication indicative of a loading of the power transfer signal by the power receiver (105).

19 Claims, 22 Drawing Sheets

(58) Field of Classification Search
 USPC .......................................................... 307/104
 See application file for complete search history.

(56) References Cited

U.S. PATENT DOCUMENTS

| | | | |
|---|---|---|---|
| 2013/0187475 A1 | 7/2013 | Vendik et al. | |
| 2015/0011160 A1* | 1/2015 | Jurgovan | H02J 50/90 |
| | | | 455/41.1 |
| 2015/0145346 A1 | 5/2015 | Ohinishi | |
| 2016/0176300 A1 | 6/2016 | Bucher | |
| 2016/0190871 A1* | 6/2016 | Nago | H02J 50/80 |
| | | | 307/104 |
| 2016/0359375 A1* | 12/2016 | Lee | H02J 50/80 |
| 2016/0380466 A1* | 12/2016 | Yang | H04B 5/0075 |
| | | | 320/106 |
| 2016/0380467 A1 | 12/2016 | Shao | |

FOREIGN PATENT DOCUMENTS

| | | |
|---|---|---|
| WO | 2014060871 A1 | 4/2014 |
| WO | 2014195143 A1 | 12/2014 |

OTHER PUBLICATIONS

System Description Wireless Power Transfer vol. 1: Low Power Part 1: Interface Definition Version 1.0. Oct. 1, 2010.

* cited by examiner

| PTx | | |
|---|---|---|
| $L_p$ | 25 | µH |
| $f_p$ | 100 | kHz |
| $Q_p$ | 100 | $2\pi f_p L_p / R_p$ |
| $u_{op}$ | 2...24 | V (pk) |
| $f_{op}$ | 100...200 | kHz |
| $u_{ping}$ | 24 | V (pk) |
| $f_{ping}$ | 175 | kHz |

| PRx | | |
|---|---|---|
| $L_s$ | 35 | µH |
| $f_s$ | 100 | kHz |
| $Q_s$ | 40 | $2\pi f_s L_s / R_s$ |
| $U_L$ | 12.0 | V (rms) |
| $I_L$ | 1.5 | A (rms) |
| $Z_L$ | 0.1...1000 | Ω |
| $Z_{ping}$ | 800 | Ω |

Constraints
- $I_p(f_{op})$ decreases with increasing $f_{op}$
- $I_p \leq I_{p,max} = 3.0$ A (rms)
- $P_p \leq P_{p,max} = 24$ W (avg)
- $U_t \leq U_{t,max} = 120$ V (rms)

FIG. 6

|     | $b_7$ | $b_6$ | $b_5$ | $b_4$ | $b_3$ | $b_2$ | $b_1$ | $b_0$ |
| --- | --- | --- | --- | --- | --- | --- | --- | --- |
| $B_0$ | Ack | \multicolumn{3}{c}{Reserved} | (msb) | | | |
| $B_1$ | \multicolumn{7}{c}{Load Impedance} | (lsb) |

FIG. 21

|       | $b_7$ | $b_6$ | $b_5$ | $b_4$ | $b_3$ | $b_2$ | $b_1$ | $b_0$ |
|-------|-------|-------|-------|-------|-------|-------|-------|-------|
| $B_0$ | Ack | Voltage Exponent | | | Reserved | Current Exponent | | |
| $B_1$ | Load Voltage | | | | | | | |
| $B_1$ | Load Current | | | | | | | |

FIG. 22

WIRELESS INDUCTIVE POWER TRANSFER

CROSS-REFERENCE TO PRIOR APPLICATIONS

This application is the U.S. National Phase application under 35 U.S.C. § 371 of International Application No. PCT/EP2017/050169, filed on Jan. 5, 2017, which claims the benefit of EP Patent Application No. EP 16151007.8, filed on Jan. 13, 2016. These applications are hereby incorporated by reference herein.

FIELD OF THE INVENTION

The invention relates to inductive power transfer and in particular, but not exclusively, to a power transmitter providing inductive power transfer using elements compatible with the Qi Specifications for wireless power transfer systems.

BACKGROUND OF THE INVENTION

Most present day systems require a dedicated electrical contact in order to be powered from an external power supply. However, this tends to be impractical and requires the user to physically insert connectors or otherwise establish a physical electrical contact. Typically, power requirements also differ significantly, and currently most devices are provided with their own dedicated power supply resulting in a typical user having a large number of different power supplies with each power supply being dedicated to a specific device. Although, the use of internal batteries may avoid the need for a wired connection to a power supply during use, this only provides a partial solution as the batteries will need recharging (or replacing). The use of batteries may also add substantially to the weight and potentially cost and size of the devices.

In order to provide a significantly improved user experience, it has been proposed to use a wireless power supply wherein power is inductively transferred from a transmitter coil in a power transmitter device to a receiver coil in the individual devices.

Power transmission via magnetic induction is a well-known concept, mostly applied in transformers having a tight coupling between a primary transmitter coil and a secondary receiver coil. By separating the primary transmitter coil and the secondary receiver coil between two devices, wireless power transfer between these becomes possible based on the principle of a loosely coupled transformer.

Such an arrangement allows a wireless power transfer to the device without requiring any wires or physical electrical connections to be made. Indeed, it may simply allow a device to be placed adjacent to, or on top of, the transmitter coil in order to be recharged or powered externally. For example, power transmitter devices may be arranged with a horizontal surface on which a device can simply be placed in order to be powered.

Furthermore, such wireless power transfer arrangements may advantageously be designed such that the power transmitter device can be used with a range of power receiver devices. In particular, a wireless power transfer approach known as the Qi Specifications has been defined and is currently being developed further. This approach allows power transmitter devices that meet the Qi Specifications to be used with power receiver devices that also meet the Qi Specifications without these having to be from the same manufacturer or having to be dedicated to each other. The Qi Specifications further includes some functionality for allowing the operation to be adapted to the specific power receiver device (e.g. dependent on the specific power drain).

The Qi Specification is developed by the Wireless Power Consortium and more information can e.g. be found on their website: http://www.wirelesspowerconsortium.com/index.html, where in particular the defined Specification documents can be found.

An important aspect of wireless power transmission is the control of operating point for the power transfer and it is in particular important to control the inductive power transfer signal to provide an appropriate power to the power receiver. In order to control the power transfer, systems such as Qi, implement a power control loop wherein the power receiver during the power transfer phase continuously transmits power control messages back to the power transmitter requesting (or not) a change in the power of the power transfer signal. The power transmitter then reacts by increasing or decreasing the power of the power transfer signal in response to the requests from the power receiver. Such an approach may provide an effective power control in many scenarios.

Typically, the power control operation is implemented such that the operating range is restricted to a range which is considered safe. For example, for systems such as Qi, the power of the power transfer signal may be limited to a given maximum value.

However, although such an approach may provide an adaptive system which is capable of adapting to variations in the operating conditions, it may not perform an ideal adaptation in all circumstances. For example, it may in some scenarios not react sufficiently fast to adapt to sudden changes in the operating conditions.

Hence, an improved power transfer approach would be advantageous. In particular, an approach that allows improved operation, improved power transfer, increased flexibility, facilitated implementation, facilitated operation, improved power control, faster response to variations in the power transfer operating characteristics, and/or improved performance would be advantageous.

SUMMARY OF THE INVENTION

Accordingly, the Invention seeks to preferably mitigate, alleviate or eliminate one or more of the above mentioned disadvantages singly or in any combination.

According to an aspect of the invention there is provided a power transmitter for transferring power to a power receiver, the power transmitter comprising: a resonance circuit comprising a capacitive impedance and an inductive impedance, the inductive impedance comprising a transmitter coil for generating a power transfer signal for wirelessly transferring power to the power receiver; a driver for generating a drive signal for the resonance circuit; a message receiver for receiving messages from the power receiver; a power loop controller for adapting a power of the drive signal in response to power control messages received from the power receiver by the message receiver, the adapting being subject to a constraint of at least one of a current of the resonance circuit, a voltage of the resonance circuit, and a power of the drive signal being below a maximum limit; and an adapter arranged to adapt the maximum limit in response to a load indication indicative of a loading of the power transfer signal by the power receiver.

The invention may provide improved power transfer in many scenarios. In particular, improved power control may be achieved. In many embodiments, the approach may provide an improved reliability and may in particular provide improved protection against over-voltage conditions occurring at the power receiver as a result of fast changes in the coupling factor resulting e.g. from movement of the power receiver relative to the power transmitter.

In particular, the inventors have realized that many current power transfer systems (such as ones following the Qi specifications) include a power control loop which may in some scenarios result in over-voltage conditions occurring at power receivers due to sudden changes in the coupling between the power transmitter and power receiver. In particular, it has been found that many existing power control approaches when extended to higher power levels may, when a quick change in the coupling occurs, result in voltages being induced that exceed levels which are considered unsuitable for circuitry of the power receiver.

Such scenarios may in particular be mitigated or prevented by the approach wherein the limits of the power control operation are constrained to values that are dynamically modified in response to indications of the loading on the power transfer signal provided by the power receiver. In particular, the dynamically varying limits for the current, voltage and/or power may ensure that the inducted voltage does not exceed unacceptable levels even for sharp changes in the coupling while still allowing higher power transfer values to be provided.

The adapter may dynamically adapt the maximum limit, and specifically may dynamically adapt the maximum limit during the power transfer phase. Thus, the adapter may allow a limitation of the current of the resonance circuit and/or the power of the drive signal to be changed during power transfer in line with changes in the loading of the power transfer signal by the power receiver.

The current of the resonance circuit may specifically be a current of the inductive impedance, and in many embodiments may be a current through the transmitter coil. In some embodiments, the current may be a current of the drive signal. In some embodiments, the resonance circuit may be a series resonance circuit with the inductive impedance consisting in the transmitter coil. In such an embodiment, the current of/through the inductive impedance, the current of/through the transmitter coil, and the drive signal current may be the same current.

The current of the resonance circuit may typically be the transmitter coil current and thus the power transmitter may be arranged to directly or indirectly limit the transmitter coil current.

The voltage of the resonance circuit may specifically be a voltage of the inductive impedance and/or the capacitive impedance, and in many embodiments may be a voltage over the transmitter coil and/or a capacitor being in series or parallel with the transmitter coil. In some embodiments, the voltage may be a voltage of the drive signal. In some embodiments, the resonance circuit may be a parallel resonance circuit with the inductive impedance consisting in the transmitter coil. In such an embodiment, the voltage over the inductive impedance, the transmitter coil, and the drive signal voltage may be the same voltage.

In some embodiments the power loop controller may adapt the power of the drive signal subject to a constraint on both the current and voltage of the resonance circuit.

The voltage of the resonance circuit may typically be the transmitter coil voltage and thus the power transmitter may be arranged to directly or indirectly limit the transmitter coil voltage.

The current, voltage and/or power may be an averaged value for one (or more) cycles of the drive signal/oscillations. The current may for example be an RMS or average (absolute) current.

The drive signal may be an output power signal providing power to the resonance circuit. The drive signal may comprise a current component and a voltage component, i.e. the drive signal may comprise a drive signal voltage and a drive signal current.

In accordance with an optional feature of the invention, the adapter is arranged to dynamically adapt the maximum limit to reflect variations in the loading provided by the power receiver.

The approach may allow efficient power control over a large dynamic range while still preventing or mitigating e.g. over-voltage conditions resulting from sudden changes in the operating conditions, such as a quick increase in the coupling between the power transmitter and the power receiver.

The adapter may be arranged to determine the maximum limit as a function of the (current) loading of the power transfer signal. The adapter may be arranged to determine the maximum limit as a function of the (load indication). The function may be a monotonous function. In many embodiments, the function may be a monotonically increasing function.

The update rate of the maximum limit may in many embodiments be higher than 0.1 Hz; 1 Hz, or even 10 Hz.

In some embodiments, the maximum limit may be determined as a value exceeding the loading of the power transfer signal by a margin. In many embodiments, the margin may be determined as a function of the loading/load indication.

In some embodiments, the maximum limit may be determined to exceed the loading of the power transfer signal by a predetermined absolute or relative offset (e.g. the maximum limit may exceed the current loading by a predetermined percentage of the current loading).

In accordance with an optional feature of the invention, the adapter is arranged to adapt the maximum limit during a power transfer phase.

The approach may provide efficient power control during active power transfer while still preventing or mitigating e.g. over-voltage conditions resulting from sudden changes in the operating conditions, such as a quick increase in the coupling between the power transmitter and the power receiver.

In the power transfer phase, the power control may be performed based on power control messages, i.e. the dynamic power control operation based on power control messages from the receiver may be active. Thus, the approach may allow for variations in the maximum limit to occur during the time in which the power control message based power control is active.

The adapter may specifically be arranged to adapt and change the maximum limit while the power is controlled by the power control messages (and thus are not constrainted by the maximum limit). In some embodiments/scenarios, received power control messages may result in a change in the power of the power transfer signal (and in the power extracted by the power receiver). The load indication may vary as a result of the changed power, and thus received power control messages may result in a change in the load indication and consequently a change in the maximum limit (and in the power of the power transfer signal). Specifically, the power loop controller may be arranged to adapt the power of the drive signal in response to power control messages and the adapter may be arranged to adapt the maximum limit in response to power control messages (either directly or via the change in the power of the drive signal).

In accordance with an optional feature of the invention, the driver is arranged to determine a power indication which is indicative of a power of the drive signal, and the adapter is arranged to determine the load indication as a function of the power indication.

This may provide an advantageous dynamic adaptive limitation of the current, voltage and/or power, and may specifically in many applications mitigate over-voltage conditions.

The adapter may be arranged to determine the maximum limit as a function of the power indication.

In accordance with an optional feature of the invention, the power loop controller is arranged to limit a current or voltage (or both) of at least one of the drive signal and the transmitter coil.

In particular, in many embodiments the adapting by the power loop controller may be subject to a drive signal current (and/or voltage)/transmitter coil current (and/or voltage) being below a maximum limit with the limit being adapted in response to the power indication. Thus, the current/voltage resulting from the power control may be subject to a limit which is dynamically adapted in response to a power of the drive signal. Specifically, in many embodiments, the power control may be subject to a constraint that the drive signal current/voltage is below a limit determined as a function of the drive signal power.

This may provide a particularly efficient power control which in many scenarios may prevent or reduce over-voltage conditions occurring at the power receiver caused by sudden changes in the coupling between the power transmitter and the power receiver.

The power of the drive signal may be determined in response to e.g. measurements of the current and voltage of the drive signal which is fed to the resonance circuit from the driver. The power of the drive signal is indicative of the power extracted from the power transfer signal, and is thus typically indicative of the power extracted by the power receiver, i.e. it is indicative of the loading of the power transfer signal by the power receiver. The power of the drive signal may for example be estimated or determined in response to e.g. measurements of the current and voltage fed in to the driver. Specifically, a power indication for the power of the drive signal may be determined as the input power for the driver (or an output circuit of this).

The current of transmitter coil reflects the magnetic field strength generated by the transmitter coil and thus the approach may allow the maximum magnetic field strength to be adapted based on the power being extracted from the power transfer signal.

In accordance with an optional feature of the invention, the maximum limit is a monotonically increasing function of a power loading indicated by the load indication.

This may provide improved power control operation and may in many embodiments reduce over-voltage conditions caused by sudden changes in the coupling between the power transmitter and the power receiver.

Specifically, the maximum limit may be determined as a function of the power loading of the power transfer signal as indicated by the load indication. The function may be a monotonically increasing function. Thus, in many embodiments, as the power being extracted from the power transfer signal by the power receiver increases, so does the maximum limit.

In accordance with an optional feature of the invention, the adapter (1309) is arranged to increase the maximum limit above a first threshold only if the load indication is indicative of a power of the drive signal being above a second threshold.

This may provide effective and low complexity operation in many embodiments and scenarios.

In some embodiments, the power loop controller is arranged to limit the power of the drive signal to be below the maximum limit.

This may provide advantageous performance and may in particular reduce the risk of over-voltage conditions at the power receiver due to sudden changes in the coupling between the power receiver and the power transmitter.

In accordance with an optional feature of the invention, the adapter is arranged to determine the maximum limit to include both a current maximum limit for the current of the resonance circuit (and/or a voltage maximum limit for the voltage of the resonance circuit) and a power maximum limit for the power of the drive signal and the adapting is subject to both the current of the resonance circuit being below the current maximum limit (and/or the voltage of the resonance circuit being below the voltage maximum limit) and the power of the drive signal being below the power maximum limit.

This may provide improved operation in many embodiments In particular it may provide improved protections against over-voltage conditions in many scenarios. Indeed, it has been realized that in many practical systems it is possible to maintain acceptably low over-voltage for an increasing operating range, and specifically higher powers, when both the power and current are limited (and with potentially different limits).

In accordance with an optional feature of the invention, the adapter is arranged to determine the load indication in response to load data received in at least one message from the power receiver, the load data being indicative of a loading of the power transfer signal by the power receiver.

This may provide improved operation and/or adaptation in many embodiments. It may allow more control of the power transfer operation to reside in the power receiver. In many embodiments, it may allow for a lower complexity and/or more accurate adaptation. It may provide a more reliable adaptation with less need for estimating the loading.

In some embodiments, the load data comprises an indication of at least one of a load current and a load voltage for a load of the power receiver, and the adapter is arranged to determine the load indication in response to the indication of at least one of the load current and the load voltage.

This may provide improved operation in many scenarios. In particular, it may in many embodiments and applications provide improved control and adaptation of the generated magnetic field potentially resulting in reduced over-voltage at the power receiver while at the same time allowing for a reduced complexity at the power receiver.

In accordance with an optional feature of the invention, the adapter is furthermore arranged to change the maximum limit in response to a detection of a change in a loading of the power transfer signal.

This may provide improved performance in many embodiments and may in particular allow a faster reaction to some potential changes. Specifically, the approach may in many applications allow an accurate but slower adaptation of the limit based on information provided by the power receiver while also allowing the power transmitter to independently detect and quickly react to potential sudden changes in the operating conditions.

The detection of a change in the loading of the power transfer signal may be by a detection in a change in a current, voltage and/or power of the drive signal.

According to an aspect of the invention there is provided a wireless power transfer system comprising a power receiver and a power transmitter for transferring power to the power receiver, the power transmitter comprising: a resonance circuit comprising a capacitive impedance and an inductive impedance, the inductive impedance comprising a transmitter coil for generating a power transfer signal for wirelessly transferring power to the power receiver, a driver for generating a drive signal for the resonance circuit, a receiver for receiving messages from the power receiver, a power loop controller for adapting a power of the drive signal in response to power control messages received from the power receiver, the adapting being subject to a constraint of at least one of a current of the resonance circuit, a voltage of the resonance circuit, and a power of the drive signal being below a maximum limit, and an adapter arranged to determine the maximum limit in response to a load indication determined based on load data received in a message from the power receiver, the load data being indicative of a loading of the power transfer signal by the power receiver; and the power receiver comprising: a data generator for generating load data reflecting a loading of the power receiver, and a transmitter for transmitting at least one message comprising the load data to the power transmitter.

In accordance with an optional feature of the invention, the data generator is arranged to determine the loading of the power receiver in response to at least one of a measurement of a load current and a measurement of a load voltage for a load of the power receiver.

This may provide effective operation and allow a lower complexity power transmitter. It may provide accurate information of load conditions at the power receiver which may allow a more accurate adaptation of the maximum limit to reflect likely over-voltage conditions in case of a sudden change in the coupling between the power transmitter and the power receiver.

In accordance with an optional feature of the invention, the transmitter is arranged to transmit the at least one message to the power transmitter in response to a detection that a change in a load of the power receiver meets a power change load criterion;

the load data of the at least one message being indicative of the change meeting the power change load criterion; and wherein the adapter is arranged to modify the maximum limit in response to detecting that the at least one message comprises load data indicative of the change meeting the power change load criterion.

This may provide a particularly efficient operation in many embodiments. For example, it may in many embodiments reduce the number of messages that need to be communicated (and thus the processing resource required to process and react to messages).

In accordance with an optional feature of the invention, the adapter is further arranged to change the maximum limit in response to a detection of a change in a power indication for the drive signal.

This may provide advantageous operation in many embodiments and scenarios. The detection of a change in the power indication for the drive signal may be (at least partially) by detecting a change in a current or voltage for the drive signal.

According to an aspect of the invention there is provided a method of operation for a power transmitter transferring power to a power receiver, the power transmitter comprising a resonance circuit comprising a capacitive impedance and an inductive impedance, the inductive impedance comprising a transmitter coil for generating a power transfer signal for wirelessly transferring power to the power receiver; the method comprising: generating a drive signal for the resonance circuit; receiving messages from the power receiver; adapting a power of the drive signal in response to power control messages received from the power receiver, the adapting being subject to a constraint of at least one of a current of the resonance circuit, a voltage of the resonance circuit, and a power of the drive signal being below a maximum limit; and adapting the maximum limit in response to a load indication indicative of a loading of the power transfer signal by the power receiver. These and other aspects, features and advantages of the invention will be apparent from and elucidated with reference to the embodiment(s) described hereinafter.

BRIEF DESCRIPTION OF THE DRAWINGS

Embodiments of the invention will be described, by way of example only, with reference to the drawings, in which

FIG. 6 illustrates an example of parameters for the equivalent simulation circuit of FIG. 5;

FIG. 21 illustrates an example of a load data message that may be used in a wireless power transfer system in accordance with some embodiments of the invention.

FIG. 22 illustrates an example of a load data message that may be used in a wireless power transfer system in accordance with some embodiments of the invention.

DETAILED DESCRIPTION OF SOME EMBODIMENTS OF THE INVENTION

The following description focuses on embodiments of the invention applicable to a wireless power transfer system utilizing a power transfer approach such as known from the Qi specification. However, it will be appreciated that the invention is not limited to this application but may be applied to many other wireless power transfer systems.

Figure 1:
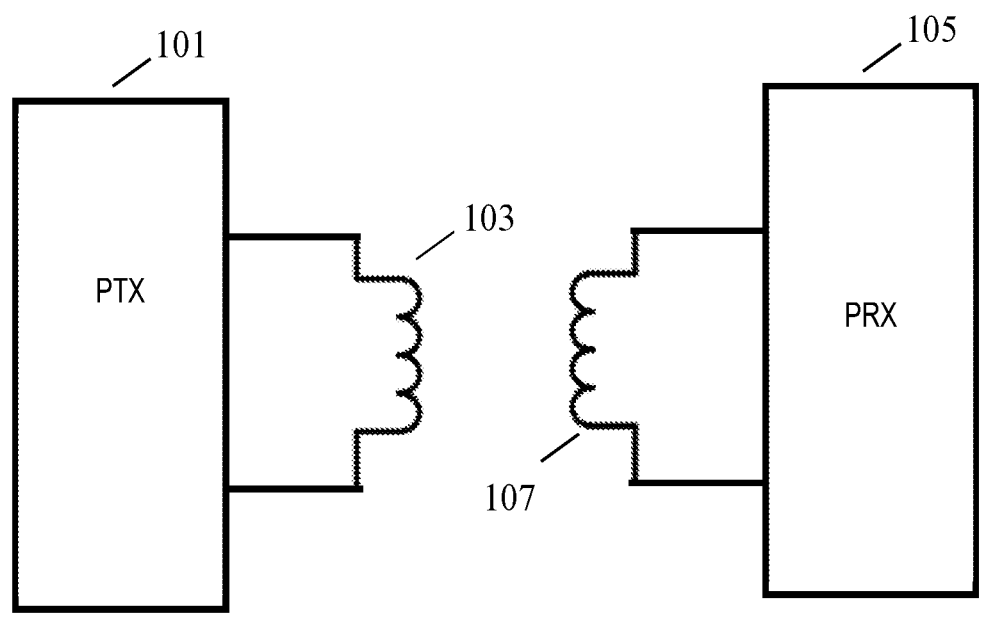
FIG. 1 illustrates an example of elements of a power transfer system in accordance with some embodiments of the invention.

FIG. 1 illustrates an example of a power transfer system in accordance with some embodiments of the invention. The power transfer system comprises a power transmitter 101 which includes (or is coupled to) a transmitter coil/inductor 103. The system further comprises a power receiver 105 which includes (or is coupled to) a receiver coil/inductor 107.

The system provides a wireless inductive power transfer from the power transmitter 101 to the receiver 105. Specifically, the power transmitter 101 generates a wireless inductive power transfer signal (also referred to as a power transfer signal, power transfer signal or an inductive power transfer signal), which is propagated as a magnetic flux by the transmitter coil or inductor 103. The power transfer signal may typically have a frequency between around 70 kHz to around 150 kHz, and often for Qi compatible systems typically in the range from 95 kHz to 115 kHz. The transmitter coil 103 and the receiver coil 107 are loosely coupled and thus the receiver coil 107 picks up (at least part of) the power transfer signal from the power transmitter 101. Thus, the power is transferred from the power transmitter 101 to the power receiver 105 via a wireless inductive coupling from the transmitter coil 103 to the receiver coil 107. The term power transfer signal is mainly used to refer to the inductive signal/magnetic field between the transmitter coil 103 and the receiver coil 107 (the magnetic flux signal), but it will be appreciated that by equivalence it may also be considered and used as a reference to an electrical signal provided to the transmitter coil 103 or picked up by the receiver coil 107.

The system is arranged to transfer substantial power levels, and specifically the power transmitter may support power levels in excess of 500 mW, 1 W, 5 W, or 50 W in many embodiments. For example, for Qi corresponding applications, the power transfers may typically be in the 1-5 W power range for low power applications, and in excess of 100 W and up to more than 1000 W for high power applications, such as e.g. kitchen applications.

Figure 2:
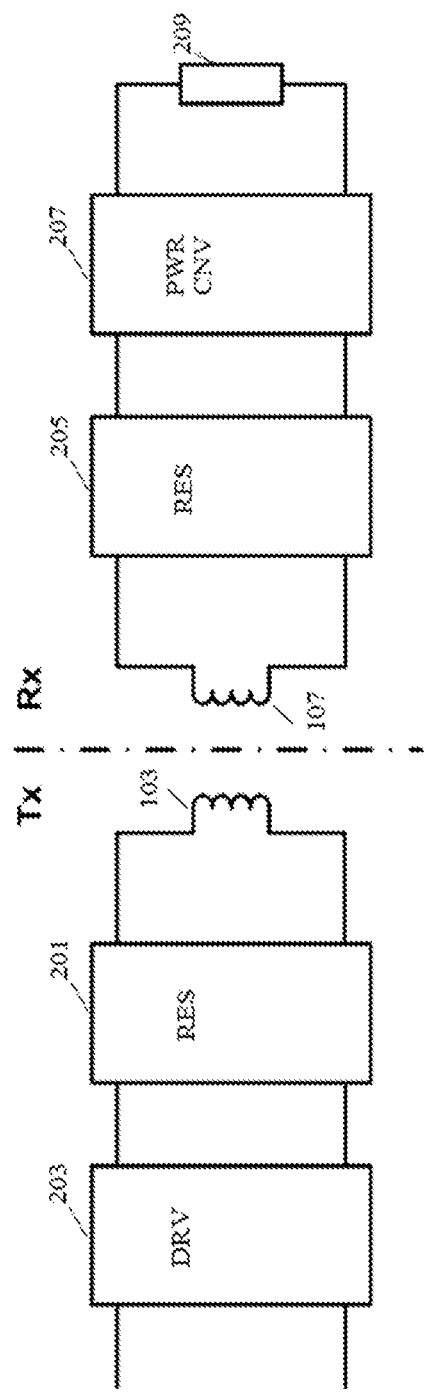
FIG. 2 illustrates an example of elements of a power transfer system in accordance with some embodiments of the invention.

FIG. 2 illustrates the system architecture of a specific example of the system of FIG. 1 in a bit more detail. In this example, the output circuit of the power transmitter 101 includes a resonance tank or resonance circuit 201, which includes the transmitter coil 103 (in FIG. 2, the transmitter coil 103 is for clarity shown external to the resonance circuit 201 but is considered to be part of this). The resonance circuit 201 of the power transmitter 101 will also be referred to as the transmitter resonance circuit 201 (or sometimes for brevity just resonance circuit 201). The resonance circuit 201 may typically be a serial or parallel resonance circuit, and may in particular consist of a resonance capacitor coupled in parallel or in series to the transmitter coil 103. The power transfer signal is generated by driving the output resonance circuit from a driver 203 generating a drive signal with a suitable drive frequency (typically in the 20-200 kHz frequency range).

Similarly, the input circuit of the power receiver 105 includes a resonance circuit or resonance tank 205 which includes the receiver inductor 107 (in FIG. 2, the receiver inductor 107 is for clarity shown external to the resonance circuit 205 but is considered to be part of this). The resonance circuit 205 of the power receiver 105 will also be referred to as the receiver resonance circuit 205 or the receiver resonance circuit. The receiver resonance circuit 205 may typically be a serial or parallel resonance circuit, and may in particular consist of a resonance capacitor coupled in parallel (or series) to the receiver inductor 107. The receiver resonance circuit 205 is coupled to a power converter 207 which converts the received power transfer signal, i.e. the induced signal provided by the receiver resonance circuit 205, into a power that is provided to an external load 209 (typically by performing AC/DC conversion as will be well known to the skilled person).

The load may for example be a battery and the power provision may be in order to charge the battery. As another example, the load may be a separate device and the power provision may be in order to power this device.

The driver 203 of FIG. 2 generates a varying (and typically AC) voltage drive signal which is applied to the resonance circuit 201 (and thus to the resonance capacitor (not shown in FIG. 2) and transmitter coil 103). In some embodiments, the transmitter resonance circuit 201 may be a series resonance circuit, and the voltage drive signal may be applied across the capacitor and inductor. In some embodiments, the driver 203 may be coupled directly (or indirectly) to the transmit coil 103 and the voltage drive signal may be provided to the transmit coil 103.

Thus, in the system, the driver 203 generates a drive signal which is fed to the transmitter resonance circuit 201/transmit coil 103, causing the transmit coil 103 to generate the power transfer signal providing power to the power receiver 105. The drive signal is generated to have a given frequency referred to as the drive frequency, i.e. the drive frequency is the frequency of the drive signal.

Figure 3:
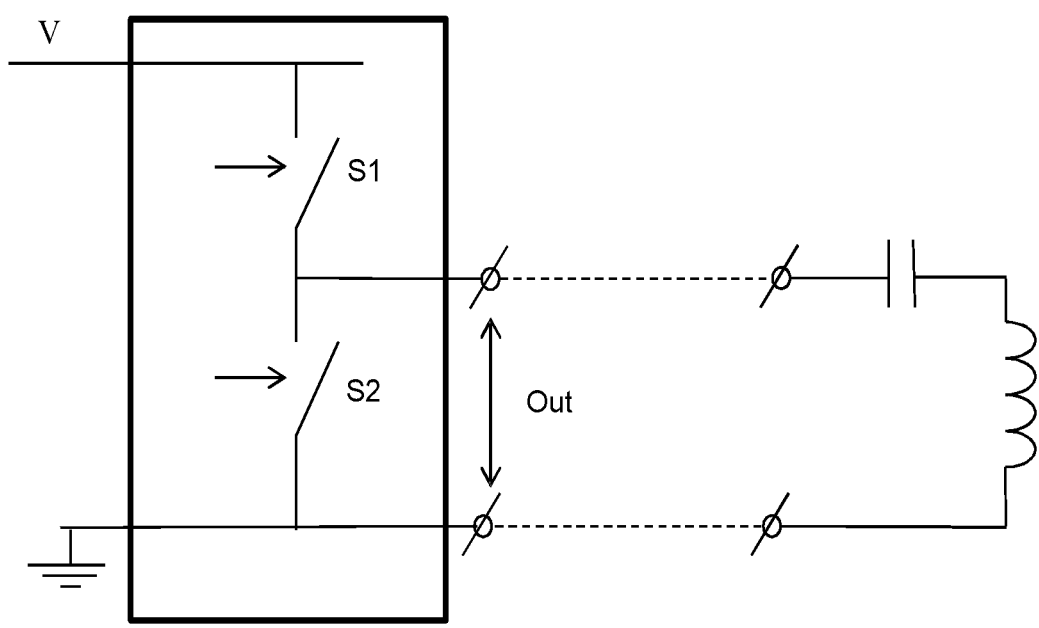
FIG. 3 illustrates an example of elements of a half-bridge inverter for a power transmitter in accordance with some embodiments of the invention.
Figure 4:
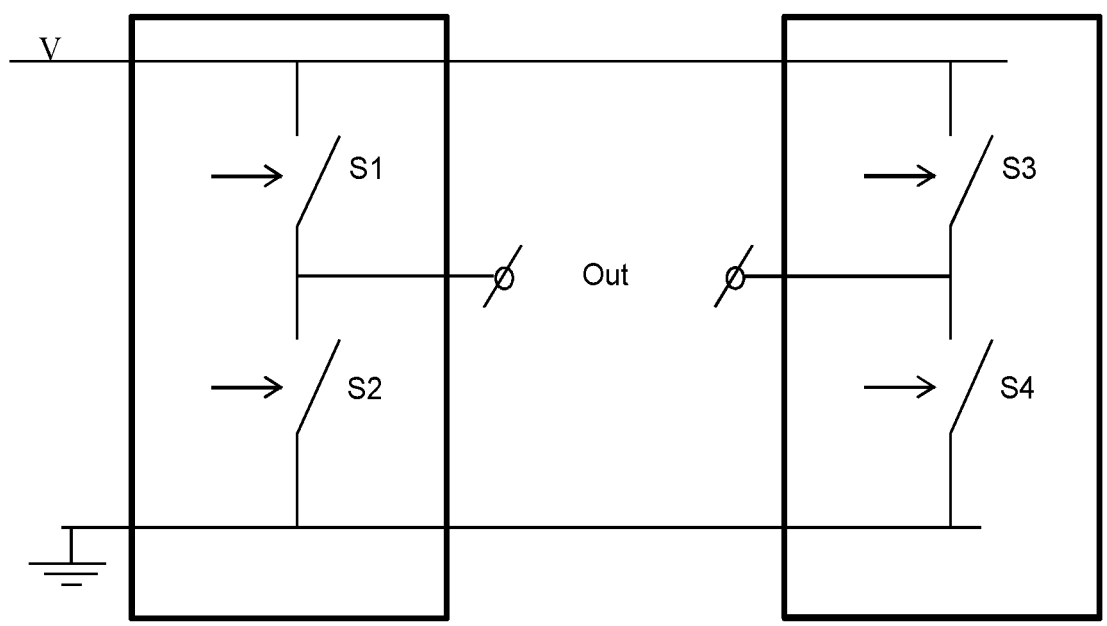
FIG. 4 illustrates an example of elements of a full-bridge inverter for a power transmitter in accordance with some embodiments of the invention.

The driver 203 generates the current and voltage which is fed to the transmitter coil 103. The driver 203 is typically a drive circuit in the form of an inverter which generates an alternating signal from a DC Voltage. The output of the driver 203 is typically a switch bridge generating the drive signal by the appropriate switching of switches of the switch bridge. FIG. 3 shows a half-bridge switch bridge/inverter. The switches S1 and S2 are controlled such that they are never closed at the same time. Alternatingly S1 is closed while S2 is open and S2 is closed while S1 is open. The switches are opened and closed with the desired frequency, thereby generating an alternating signal at the output. Typically, the output of the inverter is connected to the transmitter coil via a resonance capacitor. FIG. 4 shows a full-bridge switch bridge/inverter. The switches S1 and S2 are controlled such that they are never closed at the same time. The switches S3 and S4 are controlled such that they are never closed at the same time. Alternatingly switches S1 and S4 are closed while S2 and S3 are open, and then S2 and S3 are closed while S1 and S4 or open, thereby creating a square-wave signal at the output. The switches are open and closed with the desired frequency.

The above description corresponds to the case where the left and right bridge are 180° out of phase and provide the maximum output power or maximum duty cycle. However, in other scenarios, the bridge halves may be partial out of phase resulting in both S2 and S4 or S1 and S3 being closed simultaneously. In this state, the bridge voltage will be zero and thus the approach may be used to reduce the output power or duty cycle from the maximum values.

The driver 203 accordingly generates a drive signal and applies this signal to the transmitter resonance circuit 201. The transmitter resonance circuit 201 is formed by an inductive impedance and a capacitive impedance.

In the following, the operation of the power transmitter 101 and the power receivers 105, 107 will be described with specific reference to an embodiment in accordance with the Qi Specification (except for the herein described (or consequential) modifications and enhancements). In particular, the power transmitter 101 and the power receivers 105, 107 may substantially be compatible with the Qi Specification version 1.0, 1.1 or 1.2 (except for the herein described (or consequential) modifications and enhancements).

To control the power transfer, the system may proceed via different phases, in particular a selection phase, a ping phase, identification and configuration phase, and a power transfer phase are used in the Qi system. More information can e.g. be found in chapter 5 of part 1 of the Qi wireless power specification.

For example, when setting up communication with the first power receiver 105, the power transmitter 101 may initially be in the selection phase wherein it merely monitors for the potential presence of a power receiver. The power transmitter 101 may use a variety of methods for this purpose, e.g. as described in the Qi wireless power specification. If such a potential presence is detected, the power transmitter 101 enters the ping phase wherein a power signal is temporarily generated. The first power receiver 105 can apply the received signal to power up its electronics. After receiving the power signal, the power receiver 105 communicates an initial packet to the power transmitter 101. Specifically, a signal strength packet indicating the degree of coupling between the power transmitter 101 and the first power receiver 105 is transmitted. More information can be found in chapter 6.3.1 of part 1 of the Qi wireless power specification (or section Section 5.2.3.1 of version 1.2). Thus, in the Ping phase it is determined whether a power receiver 105 is present at the interface of the power transmitter 101.

Upon receiving the signal strength message, the power transmitter 101 moves into the Identification & Configuration phase. In this phase, the power receiver 105 keeps its output load disconnected and communicates to the power transmitter 101 using load modulation. The power transmitter provides a power signal of constant amplitude, frequency and phase for this purpose (with the exception of the change caused by load-modulation). The messages are used by the power transmitter 101 to configure itself as requested by the power receiver 105.

Following the Identification and Configuration phase, the system moves on to the power transfer phase where the actual power transfer takes place. Specifically, after having communicated its power requirement, the power receiver 105 connects the output load and supplies it with the received power. The power receiver 105 monitors the output load and measures the control error between the actual value and the desired value of a certain operating point. It communicates such control errors to the power transmitter 101 at a minimum rate of e.g. every 250 ms to indicate these errors to the power transmitter 101 as well as the desire for a change, or no change, of the power signal.

Thus, in order to prepare and control the power transfer between the power transmitter 101 and the power receivers 105, 107 in the wireless power transfer system, power receivers 105, 107 communicate information to the power transmitter 101. Such communication has been standardized in the Qi Specification version 1.0, 1.1 and 1.2.

On the physical level, the communication channel from the power receiver 105 to the power transmitter 101 is implemented by using the wireless inductive power signal as carrier. The power receivers 105 transmit data messages by modulating the load of the receiver coil 107. This results in corresponding variations in the power signal at the power transmitter side. The load modulation may be detected by a change in the amplitude and/or phase of the transmitter coil current, or alternatively or additional by a change in the voltage of the transmitter coil 103. Based on this principle, the power receiver 105 can modulate data which the power transmitter 101 can then demodulate. This data is formatted in bytes and packets. More information can be found in the "System description, Wireless power Transfer, Volume I: Low Power, Part 1: Interface Definition, Version 1.0 July 2010, published by the Wireless power Consortium" available via http://www.wirelesspowerconsortium.com/downloads/wireless-power-specification-part-1.html, also called the Qi wireless power specification, in particular chapter 6: Communications Interface (or in subsequent versions of the Specification).

In order to provide an efficient, reliable and safe power transfer the system is arranged to control the power of the generated power transfer signal by controlling a characteristic of the generated drive signal.

Power transfer to the power receiver 105 thus mainly occurs in the power transfer phase. During this phase, the power receiver monitors the output load conditions, and specifically it measures the control error between the actual value and the desired value of a certain operating point. It communicates these control errors in control error messages to the power transmitter with a minimum rate of e.g. every 250 msec. This provides an indication of the continued presence of the power receiver to the power transmitter. In addition, the control error messages are used to implement a closed loop power control where the power transmitter adapts the power signal to minimize the reported error. Specifically, if the actual value of the operating point equals the desired value, the power receiver communicates a control error with a value of zero resulting in no change in the power signal. In case the power receiver communicates a control error different from zero, the power transmitter will adjust the power signal accordingly, i.e. it will increase or decrease the power of the power transfer signal in response to the feedback from the power receiver 106.

The actual power regulation may be different in different embodiments. In some systems, the power may be adjusted by changing a voltage or a current of the drive signal. However, in most practical applications, the power may be adjusted by modifying a duty cycle or a frequency of the drive signal. For example, the generated drive signal may be a square wave signal which has a given value (often alternatively positive and negative) during active time intervals with inactive time intervals in between where the voltage is zero. Thus, power is only provided to the resonance circuit during the active time intervals. The power level may be increased and decreased by respectively increasing and decreasing the duration of the active time interval. Thus, the duty cycle may be modified to change the power provided to the transmitter communication inductor 209, and thus the power of the power transfer signal. In other embodiments, the drive frequency may be changed with the power being increased by moving the drive frequency towards the resonance frequency of the resonance circuit and being decreased by moving the drive frequency away from the resonance frequency.

Thus, during the power transfer phase, the system operates a power control loop based on power control error messages being transmitted to the power transmitter from the power receiver. This power control loop adjusts the operating point to a desired value. Specifically, in many embodiments, the power receiver may transmit power control messages to control the power of the power transfer signal to result in a given voltage being induced at the power receiver for a given load.

In addition to the power control loop operation, the power transmitter may also adopt limits for the operating range for the power transfer, and thus constraints within which the power control loop must operate. In particular, for power transmitters the power being provided to the resonance circuit may be limited to be below a given limit.

Qi originally defined a wireless power transfer for low power devices considered to be devices having a power drain of less than 5 W. However, the system is being expanded to higher power levels in order to support an increased range of devices and power transfer applications. However, the increased power levels have resulted in further challenges and it has been found that in some scenarios the approaches used for lower power applications are not appropriate for higher power levels.

In particular, it has been realized that the increased power levels (such as those being introduced by the extended power profile of the v1.2.1 Qi specification) may potentially result in damage to some power receiver devices in some situations. In particular, it has been realized that if the power receiver device is suddenly moved to increase the coupling between the power receiver and the power transmitter, an over-voltage condition may occur in the power receiver due to the power control loop inherently being relatively slow. Further, the increased power levels require higher limits, which have been found to not be sufficient to prevent such over-voltage conditions reaching potentially undesirable levels.

Specifically, it may typically be considered that the maximum input voltage to the power receiver from the power receiver coil/receiver resonance circuit should not exceed an amplitude of 20V. In most practical implementations voltages up to around 25V will tend to not cause damage to electronic circuits (such as suitable integrated circuits). However, higher voltages may in some scenarios and applications potentially damage circuitry resulting in malfunction and damage to the power receiver itself.

Typically, for low power applications, the power control and applied limits are such that the induced voltage will not exceed 20V even for very sudden changes in e.g. coupling between the devices. However, for higher power levels it has been found that this cannot be guaranteed in all situations.

As an example, the following scenario may be considered:

A user may place his phone with a wireless power receiver on a charger comprising a wireless power transmitter. He may place it in a position where the coupling between the two is poor, but sufficiently high to start up the power transfer.

After the initial steps in the communications protocol, the phone directs the charger to provide more power by sending appropriate control error packets.

The charger responds by increasing the transmitter coil current until the phone indicates that it is satisfied (by sending zero-valued control error packets), or until the charger reaches its power and/or current limit. This typically will not take more than one or two seconds after the charger and phone establish communications, and results in a large magnetic field.

Once the user discovers that the phone is only charging at a low rate due to the low coupling, he quickly moves it to a position where the coupling is (much) better.

At this moment, the large magnetic field of the charger generates a high voltage (possibly well above 20 V) in the phone, which may damage its electronics.

One option for addressing the potential over-voltage condition is to add protection circuits or voltage regulating circuits that can deal with voltages above 20 V in the power receiver. However, this is typically undesirable or even impossible due to its design constraints. In particular, it tends to introduce an unacceptable cost and complexity increase.

Figure 5:
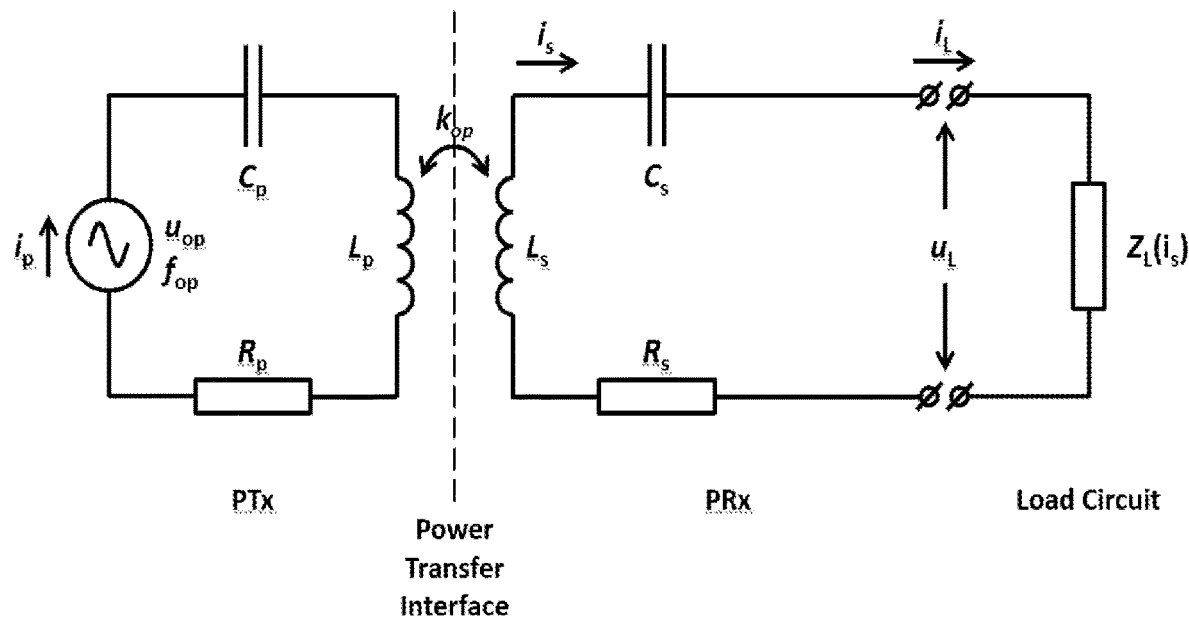
FIG. 5 illustrates an example of an equivalent simulation circuit for a wireless power transfer system.

In order to consider the scenario in more detailed, the equivalent/simulation circuit of FIG. 5 may be considered. In the example the signal generator 501 represents the driver, $C_p$ corresponds to the transmitter resonance circuit capacitor, $L_p$ represents the transmitter resonance circuit inductor, $R_p$ represents power transmitter losses, $C_s$ represents the receiver resonance circuit capacitor, $L_s$ the receiver resonance circuit inductor, $R_s$ represents power receiver losses and $k_{op}$ represents the coupling between the transmitter and receiver inductors. $Z_L$ represents the complex value load powered by the power transfer signal (and may include both some internal power receiver circuitry as well as an external load).

FIG. 6 illustrates parameter values corresponding to a Qi extended power profile (15 W). The constraints on the operating point of the power transmitter are listed beneath the table.

In particular, the power transmitter
is only permitted to be operated at frequencies above the resonant peaks in the system's transfer function;
has a current limit of 3 A (rms);
is not permitted to draw more than 24 W (average) from its power source; and
has to limit the voltage across its resonant capacitor to 120 V (rms).

Figure 7:
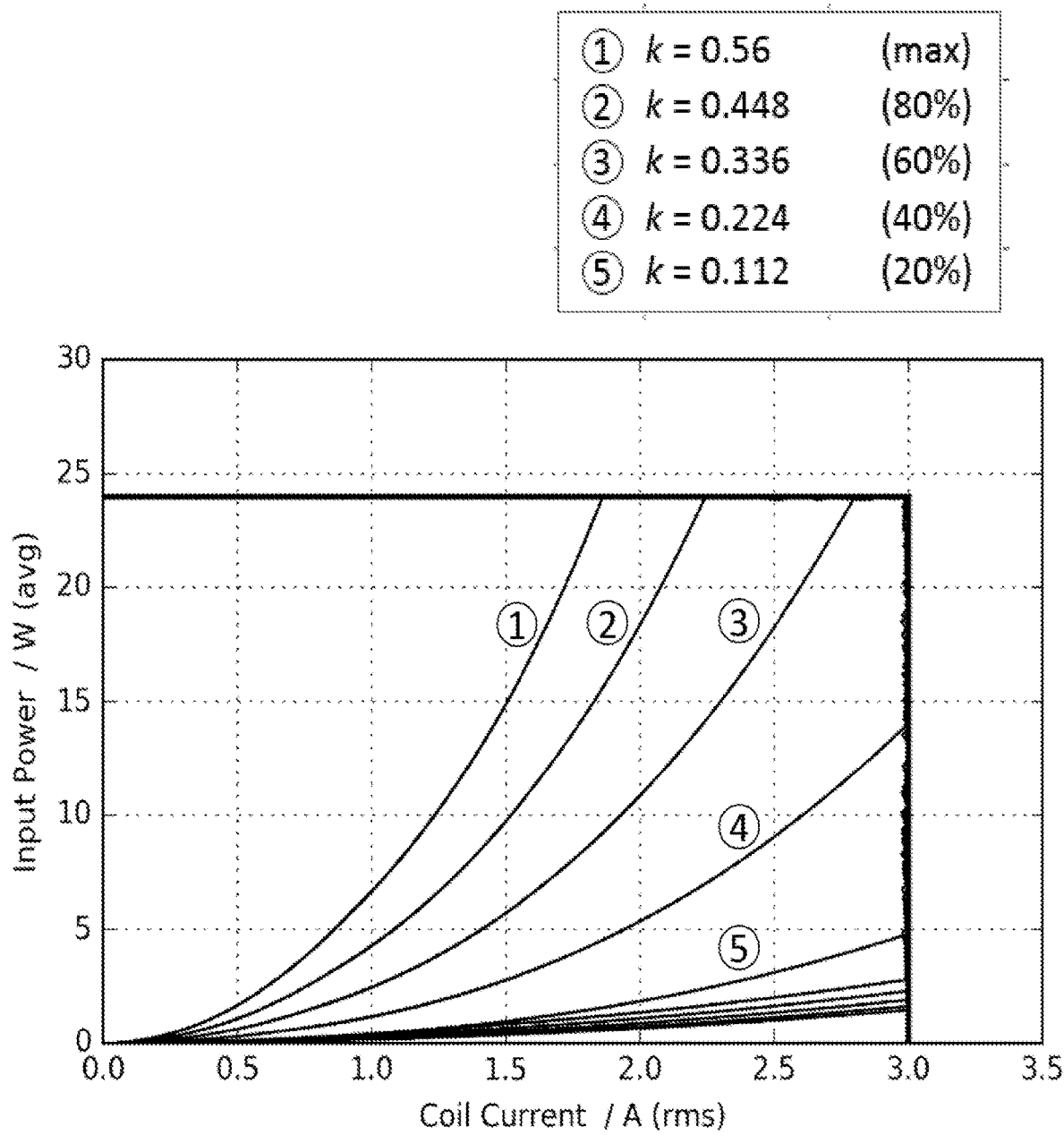
FIGS. 7-12 illustrate examples of signals in a wireless power transfer system.
Figure 8:
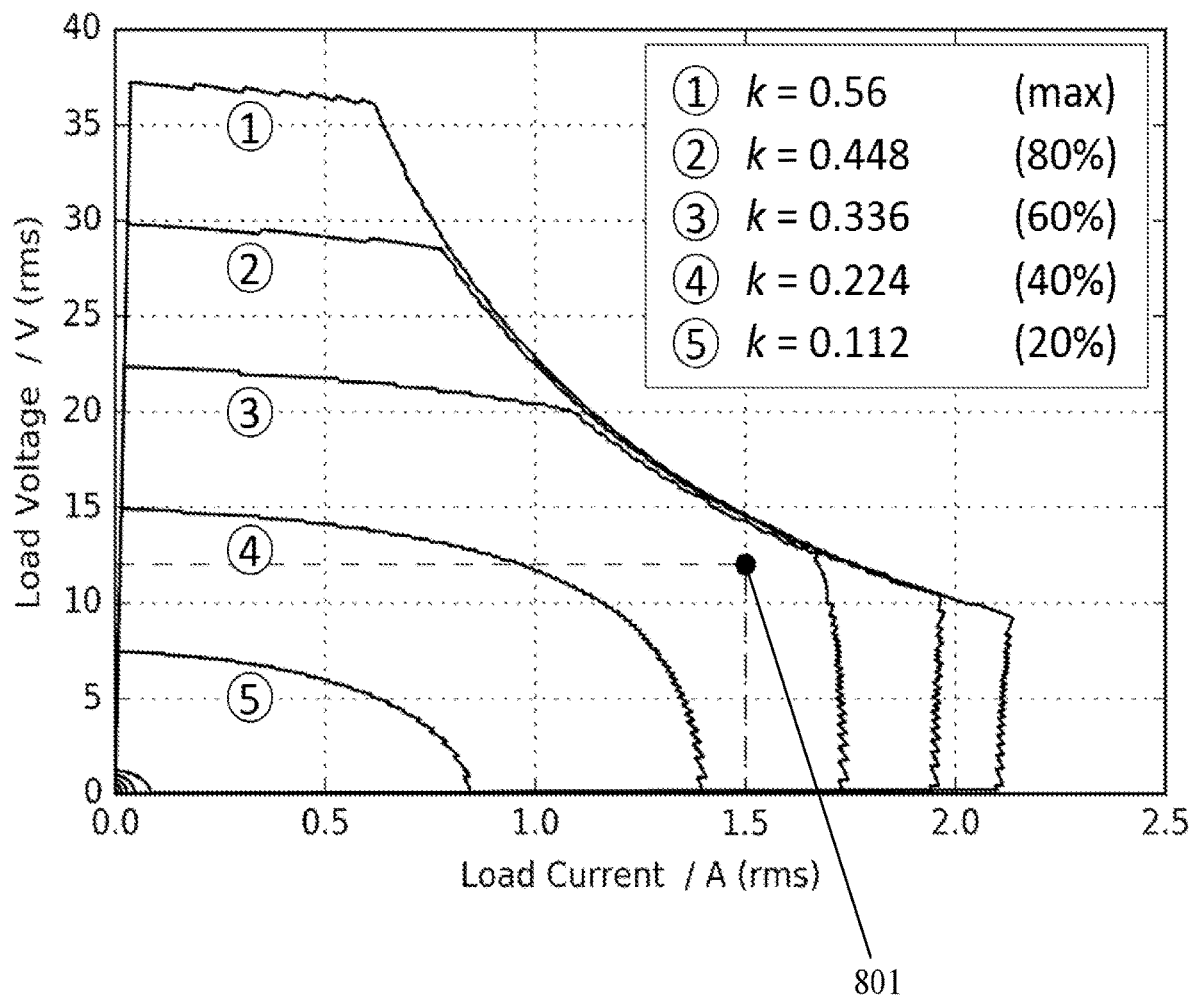

FIGS. 7 and 8 illustrate the full operating space of the system of FIGS. 5 and 6 at a coupling factor of $k_{op}$=0.56, 0.448, 0.336, 0.224, and 0.112.

The FIG. 7 illustrates the input power which corresponds to the power provided to the resonance circuit (and thus the power of the drive signal) by the driver as a function of the current through the transmitter coil 103. FIG. 7 shows the relationship for different coupling factors between the drive signal power and the coil current as the loading of the power transfer signal varies. As can be seen, the lower the coupling factor, the higher the coil current that is required in order to provide a given power. This reflects that for lower coupling factors an increased magnetic field strength is required in order for the power receiver to extract the required power. The magnetic field strength is given by the coil current and thus a higher coil current is required for a stronger magnetic field. The figures specifically illustrate the relationship between the drive signal power and the transmitter coil current after the power control has adapted to the specific load provided by the power receiver.

In the example, the power of the drive signal is limited to a maximum value of 24 W and the coil current (and thus the current of the drive signal) is limited to a maximum value of 3 A (as indicated in FIG. 7).

FIG. 8 illustrates the corresponding power receiver load voltage as a function of the load current for different couplings. The different curves illustrate the maximum values that can be achieved for the different couplings under the restrictions indicated in FIG. 7, i.e. the curves show the maximum values that can be achieved before either the power or current limits are reached. Accordingly, the curves delimit the possible operating points that can be achieved for the different coupling values.

Thus, all points within a contour of a particular curve are reachable for the system at the associated coupling. The point 801 indicates the power receiver's intended operating point in the specific example. The system can achieve the intended operating point at coupling factors down to about $k_{op}$=0.336 (it is assumed that the coupling factor of $k_{op}$=0.56 is the maximum possible given a particular physical realization). This range may be considered to provide the user with sufficient positioning tolerance. It can also be seen that the system can potentially operate with a load voltage well above $u_L=30$ V if the load impedance is above $Z_L=50\Omega$. This potential high voltage may be problematic as most circuits are designed for a maximum voltage that preferably does not exceed typically 20 V in all possible circumstances.

It should be noted that the legends of the figures are shown associated with the upper boundaries of the curves. However, it should be noted that these are part of fully closed contours representing the accessible states/operating points for a particular coupling factors. Thus, the contours defining the possible operating points for the coupling also include the power and current limits of FIG. 7 as well as the illustrated lower boundaries (corresponding e.g. to the curves at the lower right of FIG. 7 and close to (0,0) for FIG. 8. However, as these are very close together and do not differ significantly for the different couplings, individual legends are for clarity not included in the figures. Further, the following comments, description and main principles apply to the effect of the higher boundaries and limits for the operating point and thus the consideration of the lower boundaries are not significant.

Figure 9:
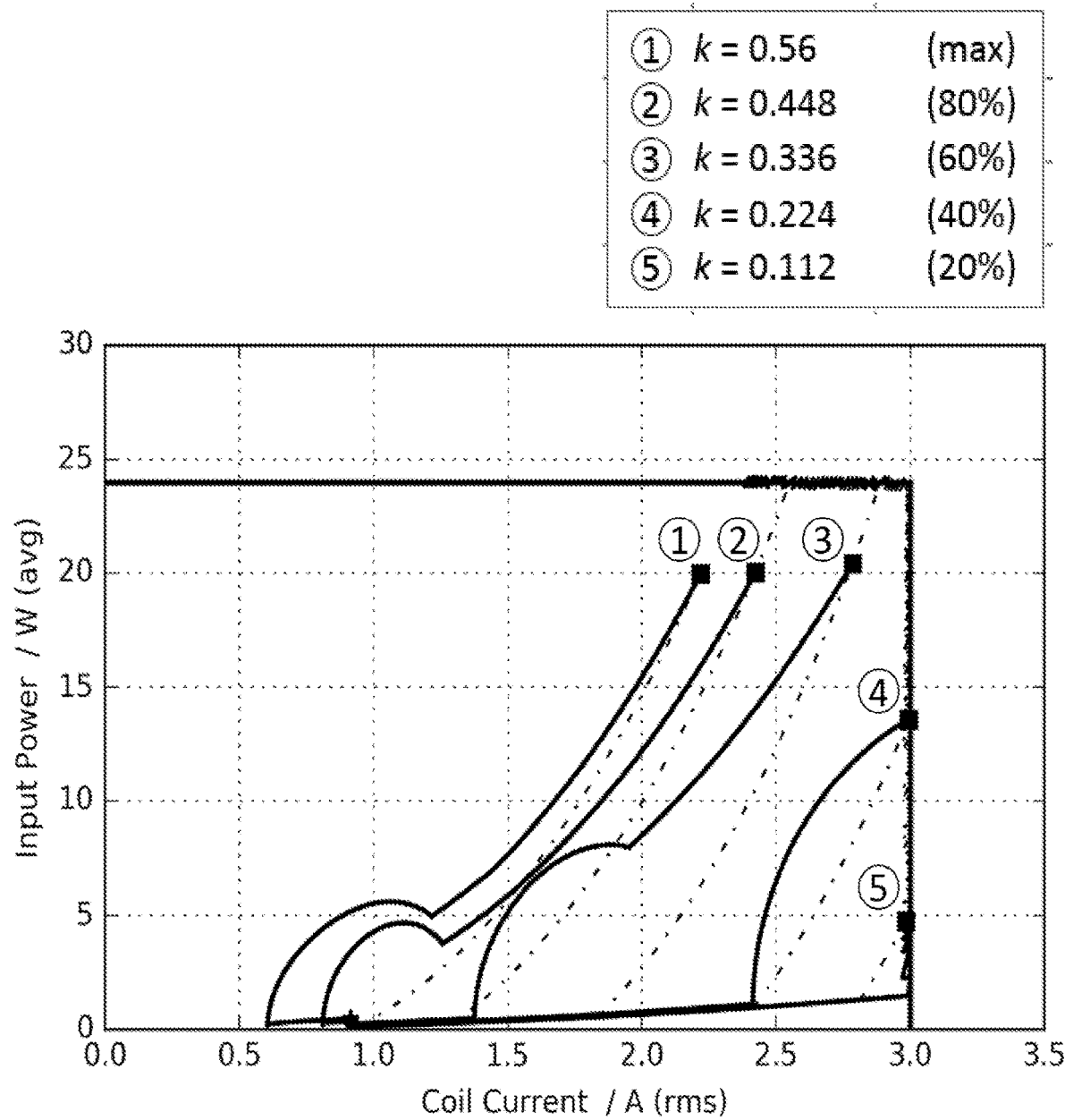
Figure 10:
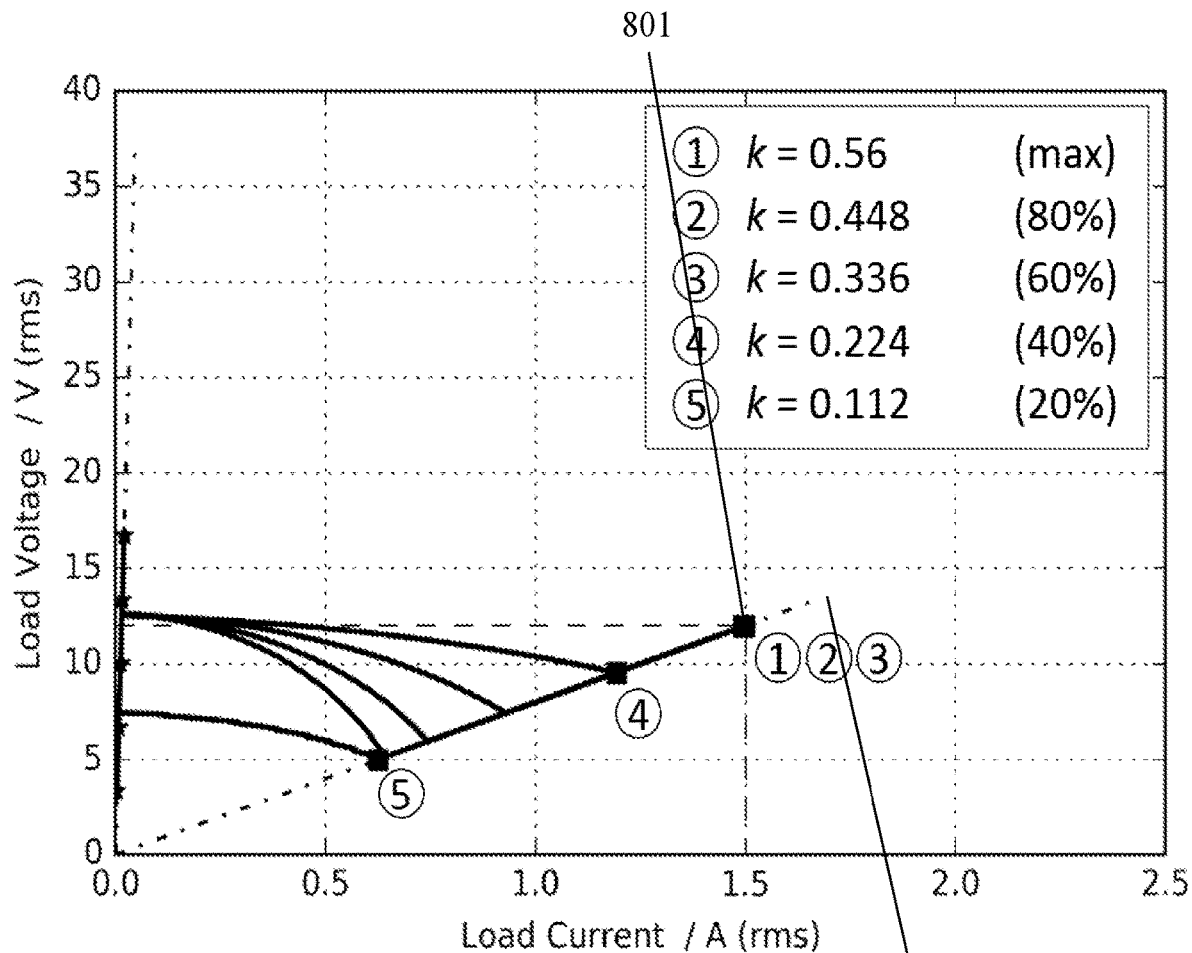

FIGS. 9 and 10 illustrate examples of how the signals may change as the systems controls the operating parameters towards the target operating point 801 for the different coupling values.

After the initialization phases of the power transfer protocol, the power receiver first controls its voltage to a level ($u_s=12.6$ V) just above its intended operating voltage ($u_s=12.0$ V). This is done at a relatively high load impedance (800$\Omega$) and accordingly the load current is very low. However, during this first phase, the power transmitter's coil current is still relatively significant and is increasing for decreasing coupling. For example, as can be seen in FIG. 9, the coil current for a coupling of 0.56 is around 0.6 A and for $k_{op}=0.224$ it is around 2.4 A. Indeed, for $k_{op}=0.112$ the current would have to be in excess of 3 A in order for the power receiver voltage to reach 12.6V and thus even this operating point cannot be reached for this coupling value.

Next, the power receiver connects its load, which results in a load step from $Z_L=800\Omega$ to $Z_L=8\Omega$. This significant load step causes the voltage in the power receiver to drop. The resulting immediate (intermediate) operating point depends on the coupling. Indeed, as illustrated in FIG. 10, for $k_{op}=0.56$ the voltage drops to around 6V and the load current increases to around 0.75 A. For $k_{op}=0.224$ the voltage drops to around 10V and the load current increases to around 1.2 A. At the power transmitter side, the coil current and the drive signal power increases correspondingly. E.g. for $k_{op}=0.56$ the input power increases to around 5 W and the coil current increases to around 01.2 A. For $k_{op}=0.224$ the input power increases to around 13 W and the coil current increases to 3 A where it is limited.

The system then proceeds to perform power control. Specifically, the power receiver continuously requests the power to be increased until the desired operating point 801 is reached. In FIG. 10 this corresponds to the operating point moving up the linear path corresponding to an 8$\Omega$ resistor until the 12V, 1.5 A operating point 801 is reached. At the power transmitter side, this results in an increasing input power and coil current until the operating point is reached. This is only possible for the three highest coupling factors as the limits are hit for the lower coupling factors. The final/ power controlled input power at the power transmitter is almost the same for the three main coupling factors (around 20 W with the difference being the power loss in the resistors indicating other losses). However, the coil current is different for the different couplings. In particular, it is around 2.2 A for $k_{op}=0.56$ and 2.8 A for $k_{op}=0.336$.

In the figures, the following legends are used:
Star: Initial operating point.
Square: Final operating point after attempting to reach the target.
Diamond: Operating point after moving to the maximum coupling from the value indicated in the legend.
Circle: Operating point after moving to zero coupling from the value indicated in the legend.

Figure 11:
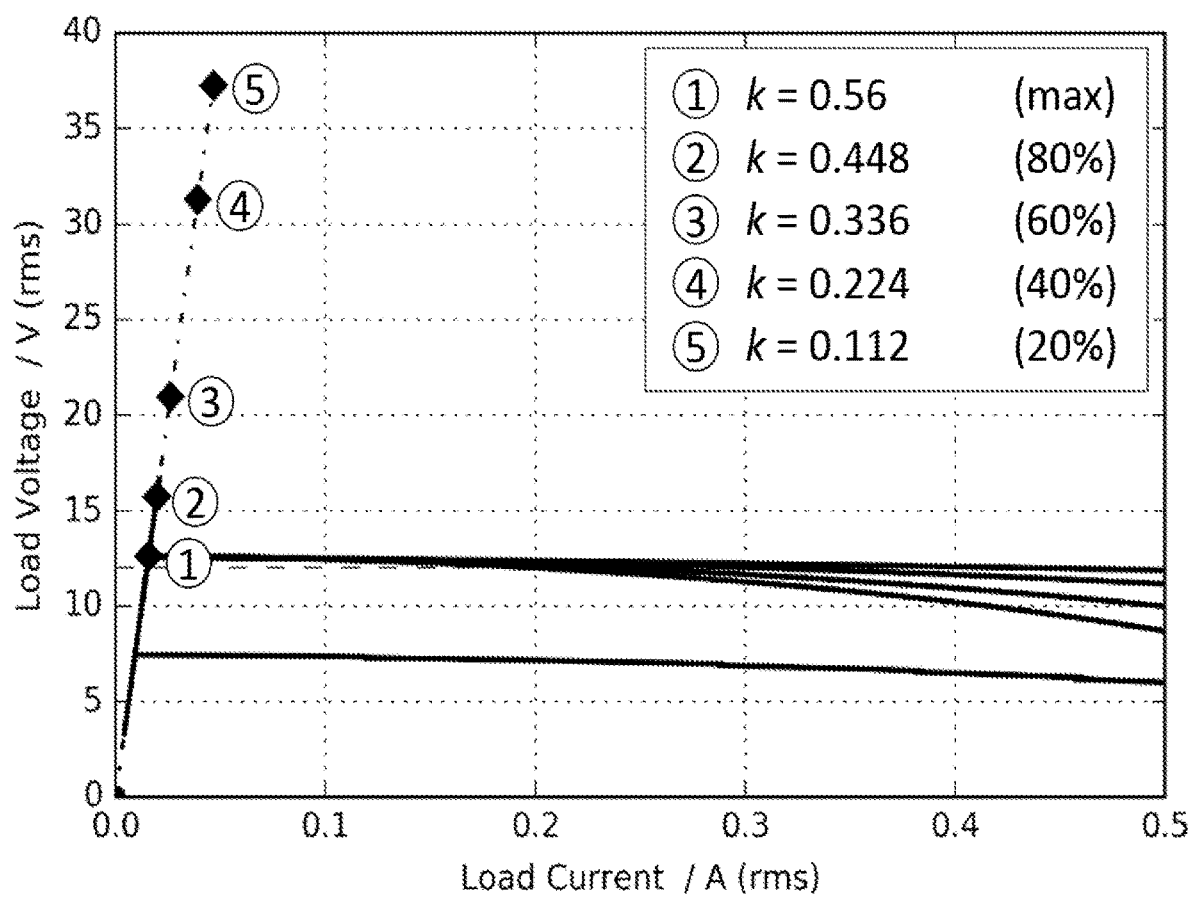

FIG. 11 shows the effect in the instantaneous operating point if the coupling point is suddenly changed. Specifically, FIG. 11 shows the change in the operating point if the coupling is suddenly changed from the current coupling level to the maximum coupling of $k_{op}=0.56$ before the load has increased (i.e. when the load impedance is still 800$\Omega$ and before it has dropped to $Z_L=8\Omega$). As expected, the change is most significant for the biggest step in the coupling i.e. for an initial coupling of $k_{op}=0.112$ where the high current (at the limit of 3 A) results in a large magnetic field and thus a high induced voltage. Indeed, as can be seen an over-voltage of more than 35V results thereby causing potential damage.

Figure 12:
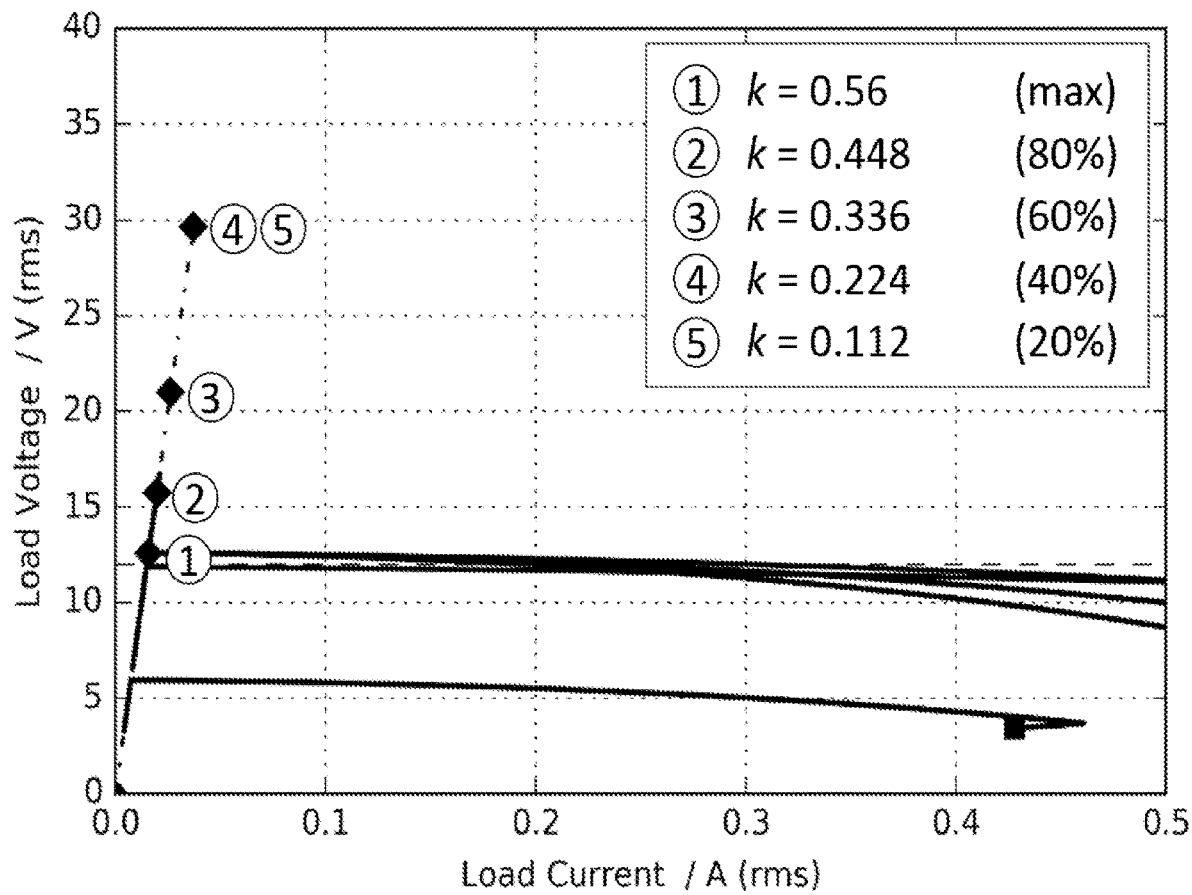

Accordingly, as can be seen, the system is susceptible to potential over-voltages due to the increased coil current required at lower coupling factors. This issue typically cannot merely be overcome by reducing the maximum limits as this will typically not sufficiently reduce the over-voltages without resulting in the available operating range being restricted more than acceptable (and thus will directly reduce the amount of power than can be transferred). Indeed, FIG. 12 illustrates the effect of reducing the coil current limit from 3 A to 2.25 A. As can be seen this may still cause over-voltages up to 30V. Further, the analysis and simulations show that the desired operating point of 12V, 1.5 can only be supported for the maximum coupling of $k_{op}=0.56$ if the current limit is reduced in this way. Thus, restricting the current limit to 2.25 A does not prevent an overvoltage but prevents the desired operating point to be reached for anything but an optimum position of the power receiver. Reducing the current further in order to reduce the overvoltage would make it impossible to reach the desired operating point.

However, it has further been realized that the over-voltage at the full load, i.e. with load impedance $Z_L=8\Omega$ is less. This is illustrated by point 1001 of FIG. 10 showing the maximum deviation from the desired operation point 801 that occurs for a sudden change in the coupling from the lowest value to the highest value. As can be seen the temporary voltage increase is relatively low, and indeed the maximum voltage is below 20V and thus an over-voltage condition is avoided.

Figure 13:
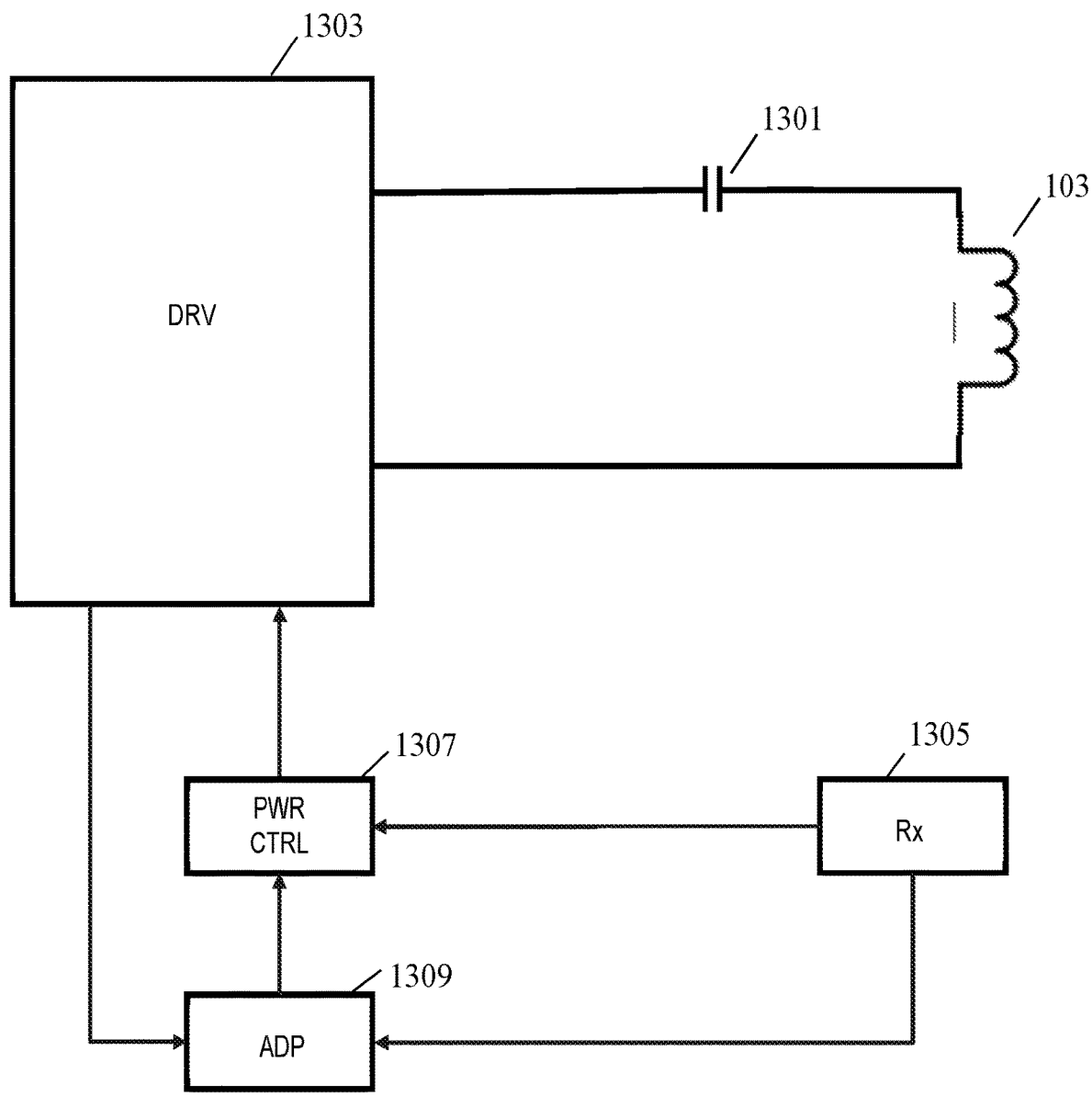
FIG. 13 illustrates an example of some elements of a power transmitter in accordance with some embodiments of the invention.

FIG. 13 illustrates elements of the power transmitter 101 in more detail. The power transmitter 101 comprises functionality which may provide improved power regulation and which may specifically in many scenarios and applications reduce or even prevent the risk of unacceptable over-voltage conditions occurring.

In the example, the power transmitter 101 comprises an inductive impedance which in the specific example directly corresponds to the transmitter coil 103. However, it will be appreciated that in other embodiments the inductive impedance may be any e.g. one port/two-terminal element which has an at least partial inductive impedance, i.e. which has an inductive reactance component, or in other words which has a complex impedance with a positive imaginary part. Thus, transmitter coil 103 of FIG. 13 may more generally be considered to represent an inductive impedance being a linear two-terminal circuit or (equivalent) component for which the voltage at the terminals is at least partly dependent on a derivative of the current through the component/circuit. In the following, the inductive impedance will for brevity be referred by referring to the specific example where it is the same as the transmitter coil 103.

The transmitter coil 103 is furthermore coupled to a capacitive impedance which together with the transmitter coil 103 (inductive impedance) forms a resonance circuit, and specifically a series resonance circuit. In the specific example, the capacitive impedance corresponds directly to a single resonance circuit capacitor (referred to as the transmitter capacitor 1301) but it will be appreciated that in other embodiments the capacitive impedance may be any e.g. one port/two-terminal element which has an at least partial capacitive impedance, i.e. which has a capacitive reactance component, or in other words which has a complex impedance with a negative imaginary part. Thus, more generally the transmitter capacitor 1301 may be considered to represent a capacitive impedance which may be a linear two-terminal circuit or (equivalent) component for which the current through the circuit/component at the terminals is at least partly dependent on a derivative of the voltage across the terminals.

It will be appreciated that in most embodiments, the resistive part of the inductive and capacitive impedances will typically be much smaller, and often negligible, compared to the reactance component. This will ensure that the oscillations are relatively undamped, i.e. it will provide a relatively high Q for the resonance circuit.

For clarity and brevity, the following description thus focus on the inductive impedance being an (ideal) inductor, and specifically being the transmitter coil 103 of FIGS. 1 and 2, and the capacitive impedance being an ideal capacitor, namely the transmitter capacitor 1301. However, it will be appreciated that any reference to the transmitter coil 103 may as appropriate be replaced by a reference to an inductive impedance or reactance, and that any reference to transmitter capacitor 1301 may as appropriate be replaced by a reference to a capacitive impedance or reactance. For brevity, the pair of the transmitter coil 103 and the transmitter capacitor 1301 will also be referred to as the resonating components.

The transmitter coil 103 and transmitter capacitor 1301 are coupled/connected together in a resonant configuration. In the example, the transmitter coil 103 and transmitter capacitor 1301 are coupled in series resonance but it will be appreciated that in other embodiments they may be coupled in a parallel resonance configuration.

The resonance circuit formed by the transmitter coil 103 and transmitter capacitor 1301 are coupled to a driver 1303 which may have an output stage that is described with reference to FIGS. 3 and 4 (and which corresponds to driver 201 of FIG. 2). Thus the driver 1303 generates a drive signal which drives the resonance circuit and which specifically induces oscillations in the resonance circuit. The drive signal is a power signal which provides power to the resonance circuit. The drive signal thus provides a voltage and current to the resonance circuit. The current of the drive signal (the drive current) is in the specific example the same as the current of the resonance circuit and the current through the transmitter coil 103 (and the transmitter capacitor 1301). The voltage of the drive signal (the drive voltage) is across the transmitter capacitor 1301 and the transmitter coil 103. Although the following description relates to a series resonance circuit, it will be appreciated that the described principles may also be applied to a parallel resonance circuit (bearing in mind the equivalence of these and especially the complementary nature of voltages and currents for series and parallel resonance circuits).

The power of the drive signal is in the example of FIG. 13, where the resonating components are considered ideal, the same as the power of the power transfer signal, and equal to the power being extracted from the power transfer signal. In practical cases, some of the power provided by the drive signal will be dissipated as losses as represented by the loss resistance $R_p$ of FIG. 5. Thus, in practice the power of the drive signal may be slightly higher than the power extracted from the power transfer signal.

The power extracted from the power transfer signal may be made up of various parasitic losses, such as losses resulting from induction of eddy currents in metallic parts present in the magnetic field generated by the transmitter coil 103. Such losses, including various parasitic losses in the power receiver 105 is represented by the loss resistance $R_s$ of FIG. 5. These losses are however typically small in comparison to the maximum loading by a target load of the power receiver, i.e. by the loading of the intended target for the power transfer.

The power transmitter 101 further comprises a message receiver 1305 which is arranged to receive messages from the power receiver 105. These messages may specifically be received by load modulation as will be known to the skilled person. The message receiver 1305 may specifically be arranged to receive power control error messages indicating whether the power receiver 105 requests an increased, decreased or unchanged power level of the power transfer signal.

The message receiver 1303 is coupled to a power loop controller 1307 which is further coupled to the driver 1303. The power loop controller 1307 is arranged to adapt a power of the drive signal in response to power control (error) messages received from the power receiver 105. Thus, the power loop controller 1307 implements the power control loop operation which allows the power of the power transfer signal to be dynamically controlled during, in particular, the power transfer phase.

The control of the power of the power transfer signal is performed by controlling the power of the drive signal, and thus the power provided to the resonance circuit. The power loop controller 1307 thus controls the driver 1303 to adapt the power of the drive signal.

As previously mentioned, this control may e.g. be directly by controlling a voltage or current component of the drive signal but is often achieved by controlling a duty cycle or a frequency of the drive signal (i.e. the further the drive signal frequency is from the resonance frequency, the lower the power will be).

The power loop controller 1307 is further arranged to limit the operating range of the power transmitter 101 in order to ensure reliable and safe operation and specifically the power loop controller 1307 may seek to prevent e.g. excessive signal values that could potentially damage components.

In particular, the power loop controller 1307 is arranged to control the drive signal subject to a constraint that a current and/or voltage of the resonance circuit and a power of the drive signal is below a maximum limit. In scenarios where both the current and/or voltage and the power are constrained, the maximum limit may of course comprise multiple different limits (e.g. one being a power maximum limit and the other being a current maximum limit). Thus, the power loop controller 1307 is arranged to control the power of the drive signal subject to at least one of a constraint that the current and/or voltage of the resonance circuit is below a current maximum limit and a constraint that the power of the drive signal is below a power maximum limit. In the following, the term maximum limit will be used to refer to both the current/voltage maximum limit(s) (for a current constraint) and the power maximum limit (for a power constraint) as appropriate. Thus, an indication that the maximum limit may be adapted may be considered to refer to the current maximum limit when constraining the current and to refer to the power maximum limit when constraining the power.

The following description will focus on embodiments wherein both the power and the current are limited but it will be appreciated that this is not essential for the described principles. Further, the embodiments will focus in embodiments wherein the current of the resonance circuit is constrained/limited whereas no specific limit is determined and applied to any voltage of the resonance circuit. However, it will be appreciated that the described principle can also be applied to voltage limits (whether alternatively or additionally to the current/power limit(s)).

The limit of the power and/or current may be achieved in different ways in different embodiments. In some embodiments, the driver 1303 may e.g. comprise a current limiter which is controlled by the power loop controller 1307. In other embodiments, the power transmitter 101 may e.g. implement a fast internal control loop. For example, the current through the transmitter coil 103 may continuously be monitored and if it increases above the current maximum limit the power loop controller 1307 may immediately control the driver 1303 to change the amplitude/frequency/duty cycle of the drive signal to reduce the current to be below the current maximum limit. In some embodiments, the system may implement an outer power control loop which controls the operating point of the power transfer with a faster inner control loop enforcing the maximum limits.

The power transmitter 101 further comprises an adapter 1309 which is arranged to adapt the maximum limit in response to a load indication indicative of a loading of the power transfer signal by the power receiver. Thus, in the power transmitter 101 of FIG. 13 the limits imposed on the power control, and specifically the maximum values or limits are not fixed but are dynamically adapted to reflect variations in the loading provided by the power receiver 105. Thus, in the system of FIG. 13 a limiter is implemented which applies a variable limit to either the power of the drive signal, the current of the resonance circuit, or possibly both.

This approach may in many scenarios and applications address the problem of over-voltages at higher power levels. The approach may reflect the realization that the over-voltage condition often may occur if the user moves the power receiver to a better position (higher coupling) when the power transmitter is operating with a high coil current (and therefore generating a strong magnetic field) but where, despite the high current, the power transmitter only delivers a small amount of power.

Thus, the system may specifically detect and prevent scenarios wherein the current is high while the power is low. Although such scenarios can be avoided by e.g. having a fixed limit on the maximum current, such a fixed limit will typically restrict the operating range unacceptably and specifically not allow higher power levels to be achieved. E.g., it could prevent the extension of the Qi specifications to higher power levels. However, in some embodiments, the power transmitter 101 of FIG. 13 may apply a current maximum value, i.e. a current limit, which is dependent on the provided power.

For example, the current maximum value/limit for the current though the transmitter coil 103, which in the example of FIG. 13 is the same as the current provided by the driver 1303 (i.e. the drive current), may be restricted to a maximum value that is dependent on the power of the drive signal. The current limit (the current maximum limit) may be reduced to a low level for a low power corresponding to a low loading by the power receiver 105. This will ensure that the magnetic field is maintained relatively low (which is not a problem as the power receiver loading is low). Accordingly, if the user moves the power receiver thereby suddenly increasing the coupling, the induced voltage will still be kept to lower levels and an over-voltage condition can be prevented. However, if the power increases, the current limit may also be increased and thus a higher magnetic field strength is allowed. This allows the support of higher power level operating points and reflect an increased loading of the power receiver. Further, if the coupling is suddenly improved, e.g. by the user moving the power receiver from a suboptimal position, the increased loading of the power receiver results in the voltage spike being reduced substantially.

Thus, in many embodiments, the power transmitter may limit the coil current depending on the amount of power that it is providing, where the limit is lower if the amount of power is lower. Thus, the current maximum limit may be determined as a monotonically increasing function of the power of the drive signal (and thus the power provided to the resonance circuit).

Figure 14:
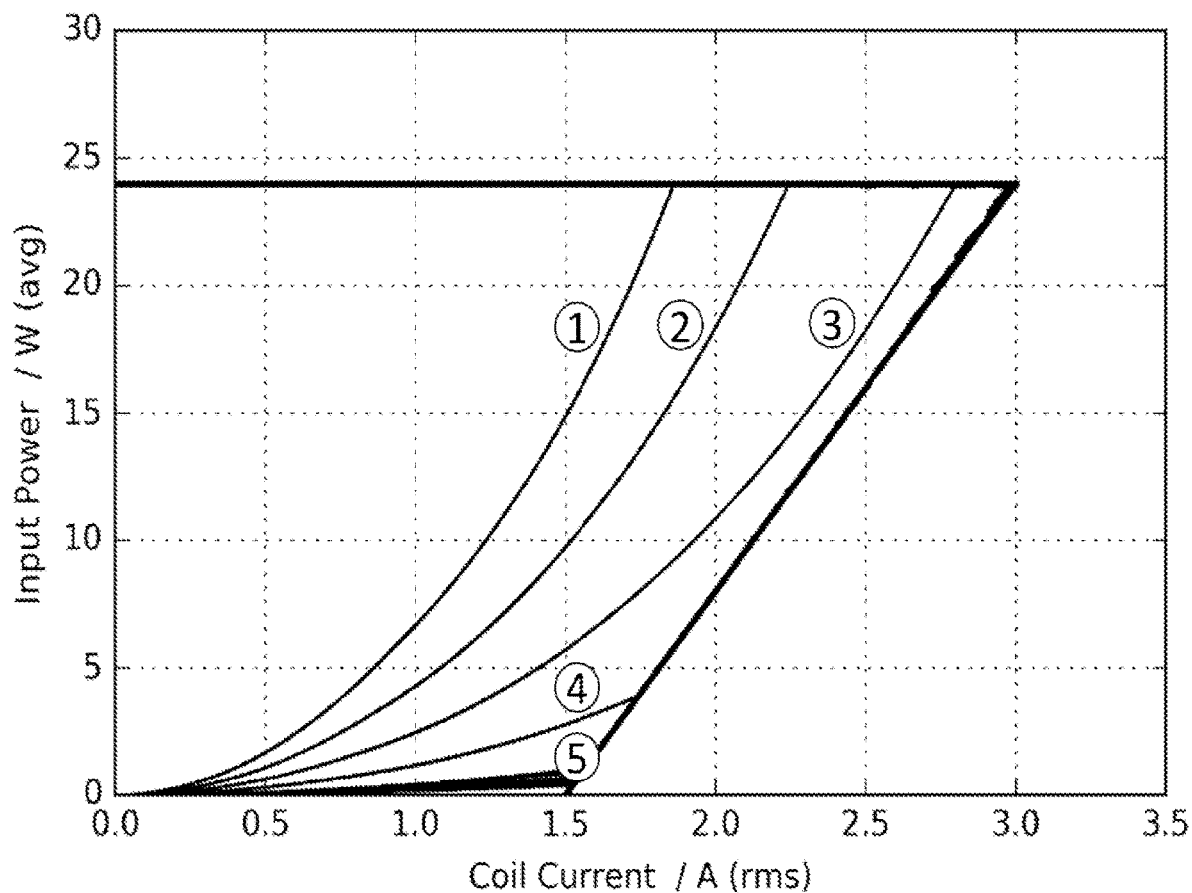
FIGS. 14-19 illustrate examples of signals in a wireless power transfer system.
Figure 15:
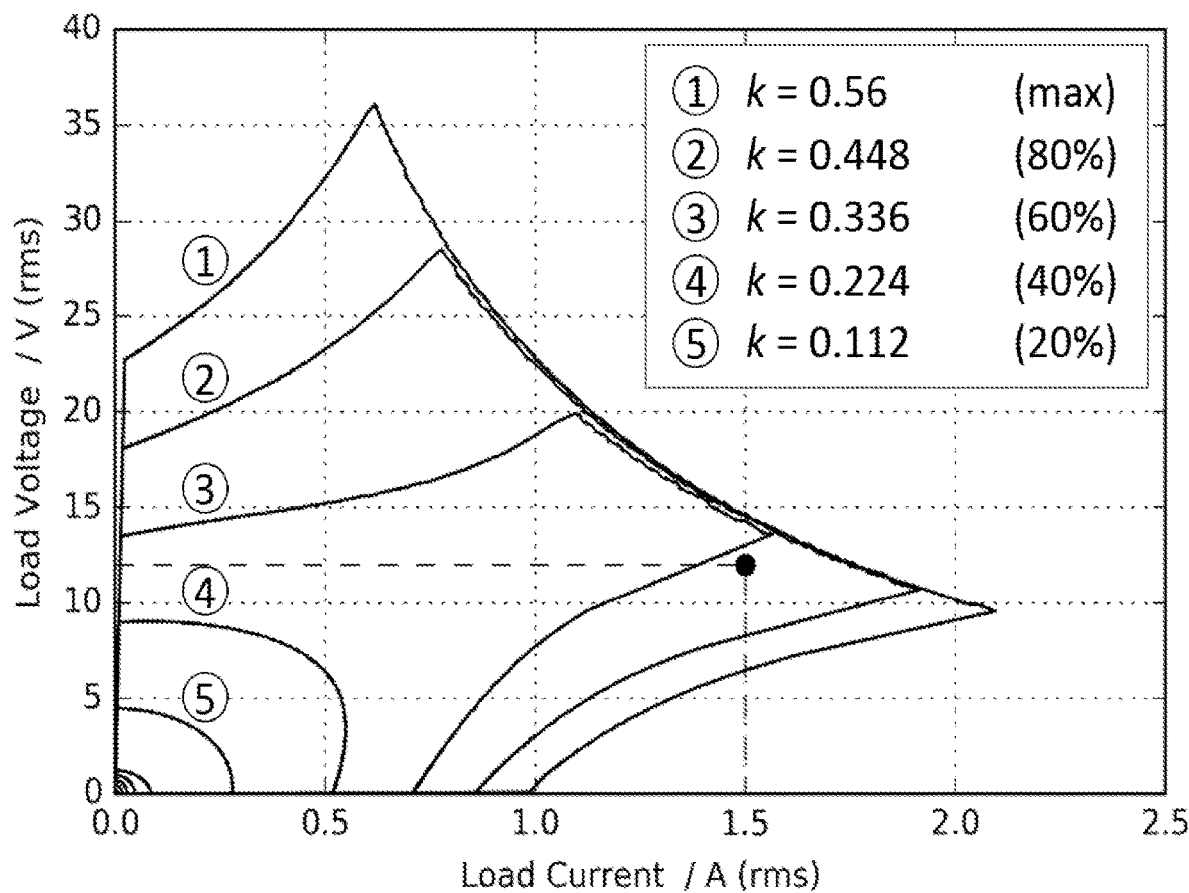
Figure 16:
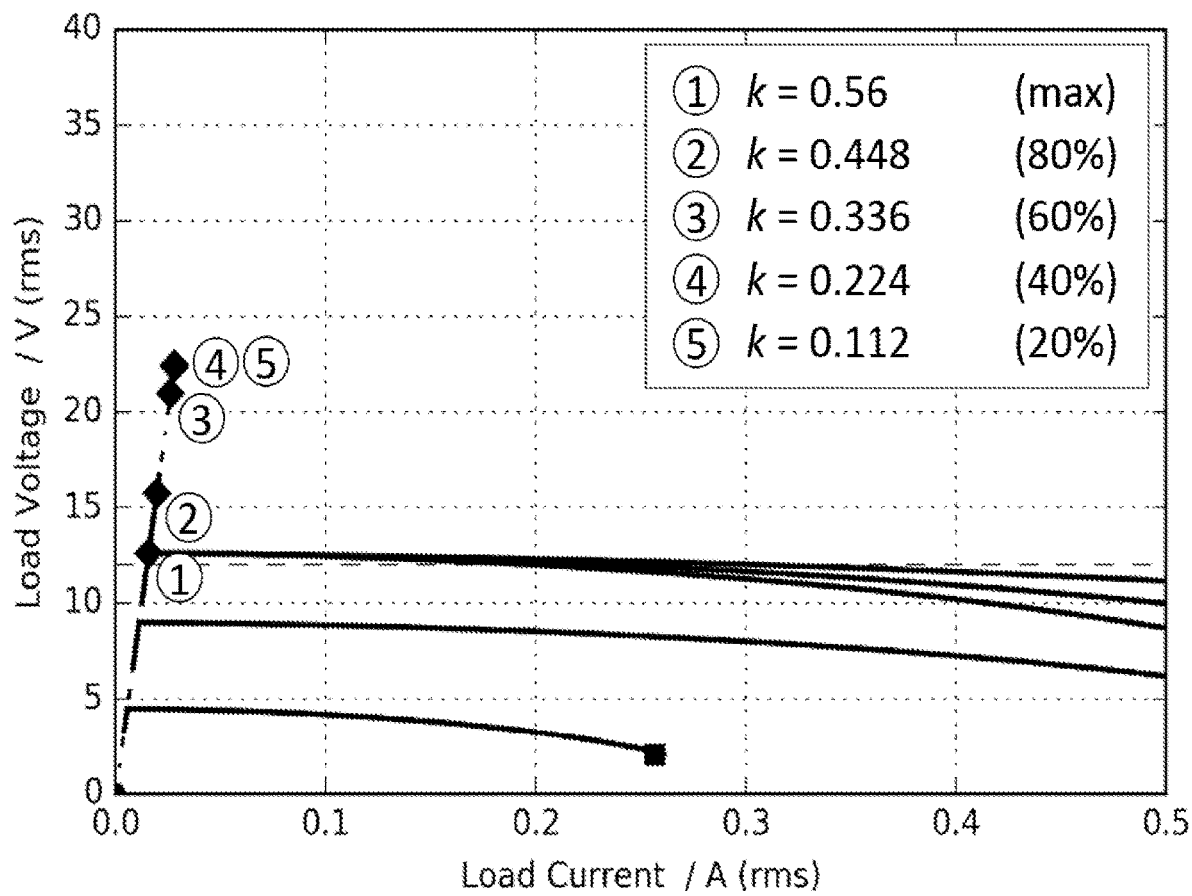

The operation may further be illustrated in FIGS. 14, 15 and 16 which correspond to FIGS. 7 to 12 but with a variable current limit that is dependent on the power of the drive signal, and specifically with the current limit having a linear relationship with the power of the drive signal.

In the example, the power loop controller 1307 ensures that the drive signal provides a minimum amount of power for currents above $I_p$=1.5 A, i.e. the current limit for zero power being provided is set to $I_p$=1.5 A. As the power increases, the current limit also increases linearly. The current limit linearly scales from 1.5 A at minimum power to 3 A at maximum power of 24 W, i.e. with a slope of around 62.5 mA per W. This is illustrated in FIG. 14. The resulting operating ranges for different couplings is shown in FIG. 15. FIG. 16 illustrates the over-voltages that may occur when the coupling is suddenly changed from a lower level to the maximum coupling of $k_{op}$=0.56.

As can be seen, the potential over-voltage issue is much reduced at the impedance of $Z_L$=800Ω. The analysis (and specifically simulations) also that the increase in voltage at the higher current and power is still low and indeed the maximum voltage (for a step from the lowest to the highest coupling) is only around 13V. Thus, in this case, the voltage does not rise above 20V and no over-voltage condition occurs. The exact overshoot and maximum voltage may of course depend on various characteristics including in particular the speed of the power transmitter's current regulation.

However, although the linear relationship between current limit and power may provide advantageous performance in many cases, it may in some scenarios not be optimal. For example, in the specific example the maximum voltage still reaches about 22 V, which is above the preferred limit of 20 V. Moreover, at a load impedance of just over $Z_L$=50Ω, the operating space at the power receiver still peaks at a voltage level of $u_L>35$ V. One way to mitigate this is to design the system in such a way that the coupling factor can never reach above e.g. $k_{op}=0.336$ (ref. FIG. 15). However, if this approach is taken, the intended operating point of the power receiver must be adjusted as well since the available operating range is substantially limited. Another issue with this approach is that it substantially reduces the positioning tolerance: if the coupling factor is reduced from $k_{op}=0.336$ to $k_{op}=0.224$, the system is not even able to transfer a power of 5 W. Accordingly, a linear relation between input power and coil current limit may not be ideal for all scenarios.

Figure 17:
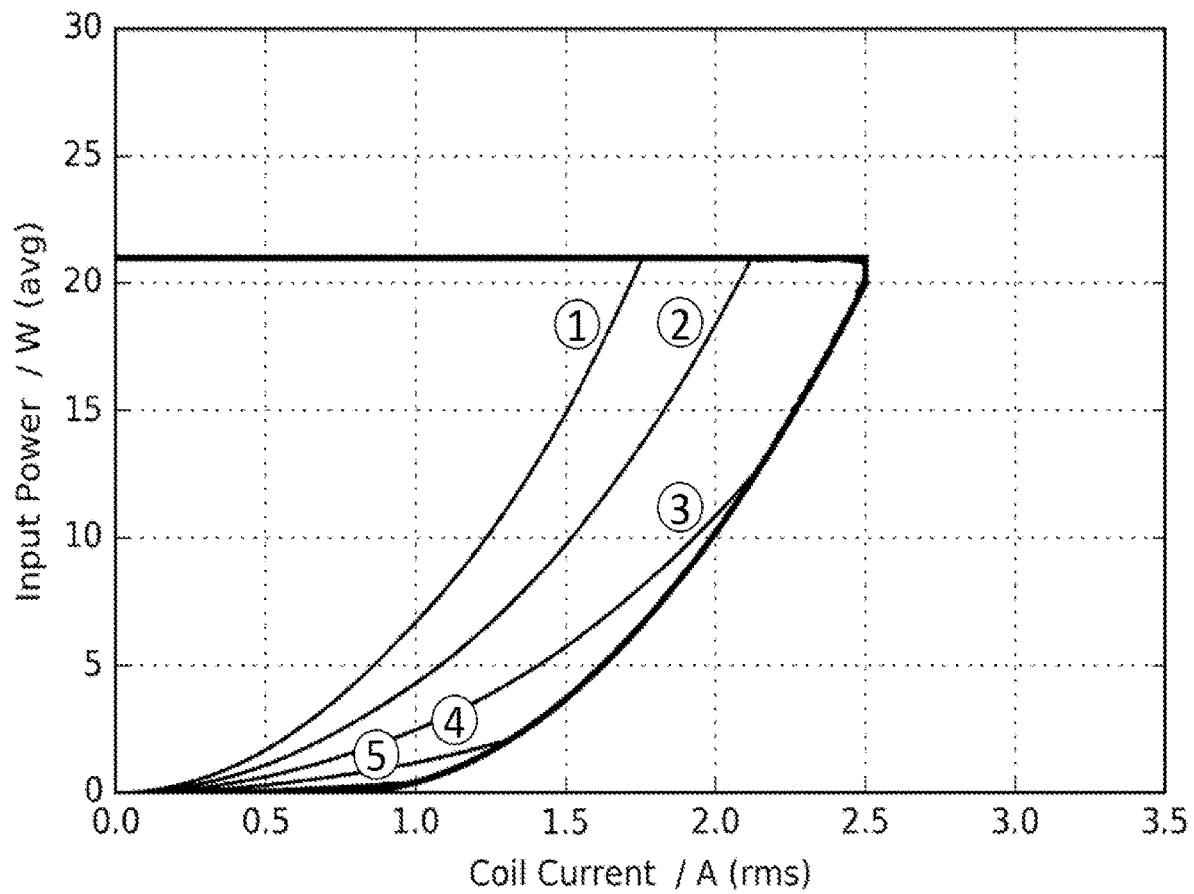
Figure 18:
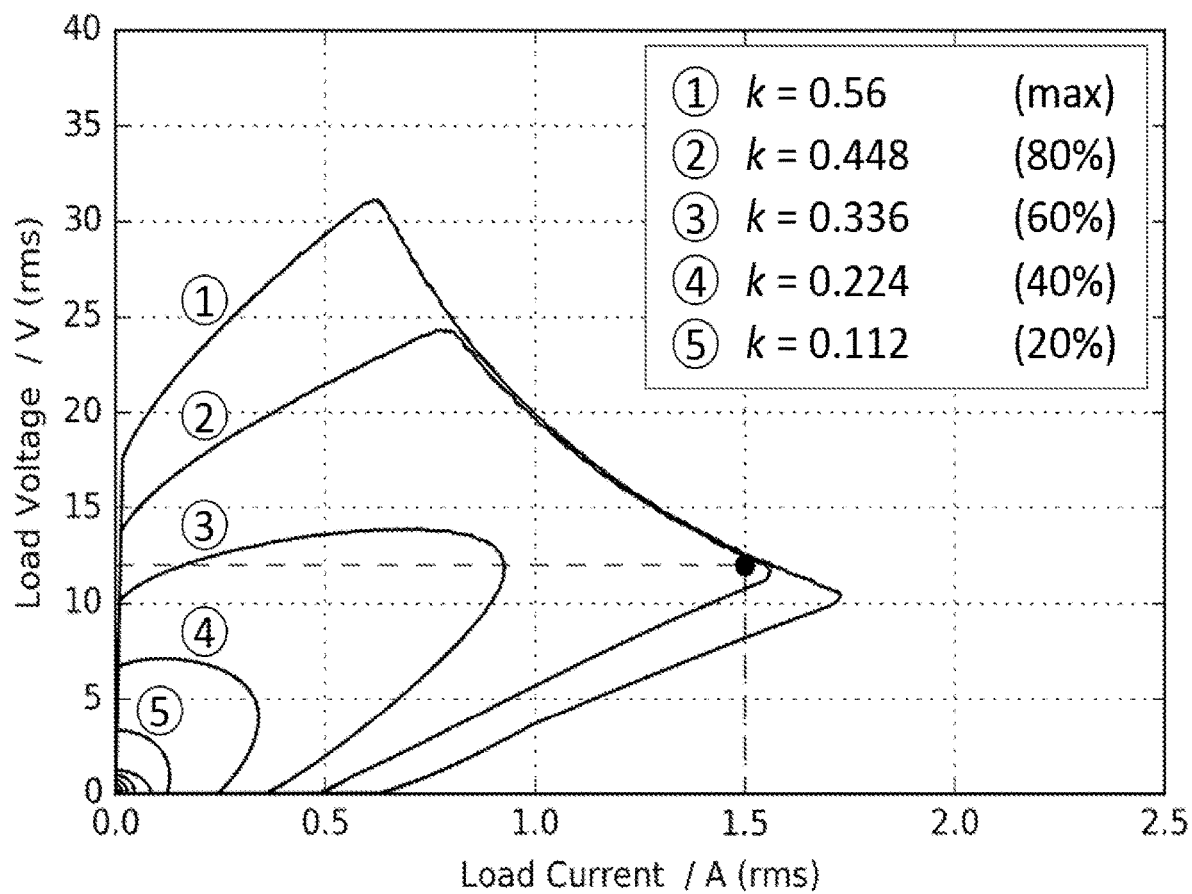
Figure 19:
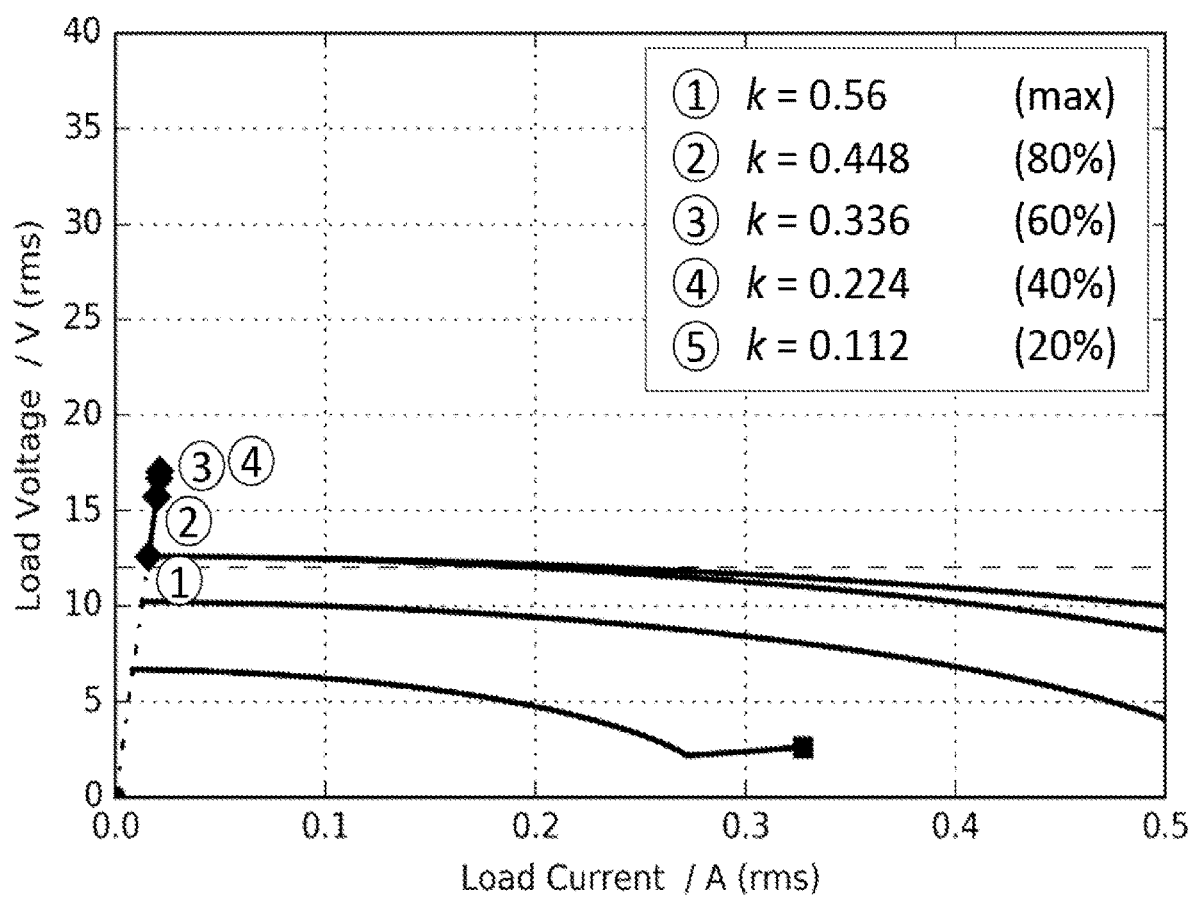

In some embodiments, it may be preferable to use a non-linear relationship. For example, FIGS. 17-19 correspond to those of FIGS. 14-16 but using a second order polynomic relation between input power and coil current limit.

In the power transmitter 101 of FIG. 13, the maximum value for the current of the resonance circuit is thus determined as a function of a load indication reflecting a loading of the power transfer signal by the power receiver.

The load indication may specifically be determined by considering the power provided to the resonance circuit, i.e. the power of the drive signal. The driver 1303 may specifically determine a power indication which is indicative of a power of the drive signal. This may for example be determined by directly measuring e.g. the current and voltages of the drive signal and then calculating the instantaneous power. This may then be low pass filtered and e.g. the RMS power value may be determined.

However, in many embodiments, the power may be determined as the input power to the driver 1303. This may in many embodiments be easier and result in lower complexity. Indeed, the input voltage to the driver 1303 is often a DC voltage and thus the power can be determined directly from the input current to the driver 1303. As the losses in the driver 1303 are typically relatively low compared to the power of the drive signal, the input power to the driver 1303 tends to be an accurate measure of the power of the drive signal, and thus of the power extracted from the power transfer signal. It is accordingly also an indication of the power extracted from the power transfer signal by the power receiver 105 and thus of the loading of the power receiver 105.

The load indication may accordingly be generated based on the power indication for the drive signal, i.e. it may be generated from the input power to the driver 1303. For example, losses in the driver 1303 and resonance circuit may be estimated and subtracted from the measured input power to generate a power transfer signal power estimate which may be used as a load indication for the power receiver. In other embodiments, the determined input power may directly be used as the load indication.

In the example, the driver 1303 is arranged to constrain/limit the current of the drive signal and as this is the same as the transmitter coil current, this also inherently constrains/limits the transmitter coil current. In some embodiments, the drive signal current and transmitter coil current may not be identical (e.g. if there are components in parallel to the transmitter coil 103). In such scenarios, the power transmitter 101 may specifically limit the transmitter coil current, e.g. by a current limiter in series with the transmitter coil 103. In some embodiments, the transmitter coil path may include a current sense for measuring the transmitter coil current, and the drive signal may be controlled such that this measured current does not exceed the current maximum value.

In the specific example, the adapter 1309 determines the maximum limit as a monotonically increasing function of a loading indicated by the load indication, and specifically of the power indication (e.g. it is dependent on the drive signal power/current/voltage. Specifically, the current maximum limit may be determined as a monotonically increasing function of the power of the drive signal, e.g. as estimated by the driver input power. This may reduce over-voltage conditions while still allowing the system to support operating points at higher power levels.

In some embodiments, the function may be a linear function but as described above advantageous operation may in many scenarios be achieved using a non-linear function.

In some embodiments, the adapter 1309 is arranged to increase the maximum limit above a first threshold only if the load indication is indicative of a power of the drive signal being below a second threshold. For example, in the example of FIG. 14, the adapter 1309 is arranged to only increase the current limit above the threshold of 1.5 A if the power of the drive signal increases above the threshold of 0 W. It will be appreciated that in other embodiments, other or indeed more thresholds may be included. For example, the current limit may only be increased above, say, 2 A if the power of the drive signal increases above, say, 7 W. It will be appreciated that the exact values may depend on the preferences and requirements of the individual embodiment. In particular, they may depend on the various electrical properties of the power transmitter and power receiver as well as the intended operating ranges.

In many embodiments, the adapter is arranged to determine the maximum limit as a function of the (current) loading of the power transfer signal. The adapter may be arranged to determine the maximum limit as a function of the (load indication).

In some embodiments, the maximum limit may be determined as a value exceeding the loading of the power transfer signal by a margin, which e.g. may be determined as a function of the loading/load indication. For example, the maximum limit may be determined to exceed the loading of the power transfer signal by a predetermined absolute or relative offset (e.g. the maximum limit may exceed the current loading by a predetermined percentage of the current loading).

The above examples have focused on a scenario wherein the current limit has been adapted based on the load indication. However, as described, in some embodiments, the adapter 1309 may alternatively or additionally be arranged to adapt the power maximum limit based on the currently experienced load conditions. Thus, in some embodiments, the power control loop that is operating e.g. during the power transfer phase may be arranged to drive the system towards its desired operating point subject to the maximum power of the drive signal not exceeding a limit which is dynamically adapted based on the load indication which reflects the loading of the power transfer signal by the power receiver.

The adaptation and modification of the limit may typically be slower than the rate at which changes in the load occur. For example, the system may operate at the desired operating point of 12V and 1.5 A, i.e. with a load of 18 W. In response, the adapter 1309 may restrict the power of the drive signal to, say, 20 W. In case, the user now moves the power receiver resulting in a sudden increase in the coupling between the power transmitter and power receiver, this may result in an increased voltage being induced at the power receiver. However, this increased voltage may result in an increased current in the load impedance (e.g. if this is fed directly from the induced voltage) and thus in an increased power consumption by the power receiver. Thus, the loading of the power transfer signal is suddenly increased but since the limit adaptation is typically relatively slow, the limit will (at least for the time being) remain at 20 W. Thus, the power available to the power receiver is restricted by the maximum limit and accordingly the power can only increase by a certain amount. Thus, the initial over-voltage will be restricted to a low level. Further, the power control will relatively quickly adapt to the higher coupling and restore the power transfer to be at the operating point of 12V and 1.5 A and thus the system will adapt to the desired operating point with only a relatively low spike in the voltage of the power receiver.

However, if instead the desired operating point were at 12V and 0.1 A, corresponding to a power transfer of 1.2 W, a power limit of 20 W would result in a potentially large over-voltage and current being generated at the power receiver. Indeed, the power could temporarily (until corrected by the power control loop) increase by a factor of more than 16 times thereby causing a short term spike in the voltage of more than 50V (for a constant resistive load fed directly from the induced voltage).

However, in the present case, the power limit would be adjusted to reflect the lower operating point. For example, the adapter 1309 may adapt the power limit to be e.g. 1.8 W. In this case, the over-voltage spike is less than 15V. It will then be regulated back to the 12V, 0.1 A operating point by the power control loop.

Thus, the power limit may be dynamically adapted resulting in a reduced spike in the over-voltage potentially arising from a sudden change in coupling factor.

It will be appreciated that the different control and regulations may operate with different time constants in many embodiments. For example, in many embodiments, the adaptation of the maximum limit may be substantially slower than the adaptation of the power control loop. Indeed, in many embodiments a time constant of the regulation of the power control loop may be at least five or ten times lower (faster) than a time constant of the regulation/adaptation of the maximum limit in response to the load indication. The slower reaction may e.g. be caused by the load indication being determined with more averaging or low pass filtering than applied in the power control loop.

Also, the enforcement of the maximum limit may be by a fast internal loop in the power transmitter. A time constant of the limitation may typically be may be at least five or ten times lower (faster) than a time constant of the regulation of the power control loop.

However, it will be appreciated that this is not always the case. For example, in the example where the current is limited by a value dependent on the drive signal power, the adaptation may in some embodiments have a corresponding time constant or even a lower time constant than for the power control loop operation.

The update rate of the maximum limit may in many embodiments be higher than 0.1 Hz; 1 Hz, or even 10 Hz.

The adaptation of the maximum limit may thus occur during a power transfer phase and specifically during a time when the power control operation based on power control messages is active (and specifically at times when the constraints are not active).

In some embodiments/scenarios, received power control messages may result in a change in the power of the power transfer signal (and in the power extracted by the power receiver). The load indication may vary as a result of the changed power, and thus received power control messages may result in a change in the load indication and consequently a change in the maximum limit. Specifically, the power loop controller may be arranged to adapt the power of the drive signal in response to power control messages, and the adapter may be arranged to adapt the maximum limit in response to power control messages (either directly or via the change in the power of the drive signal).

In the previously described examples, the load indication is determined by the power transmitter based on properties determined by the power transmitter. However, in other embodiments, the load indication may be determined based on load data that is received from the power receiver with the load data being indicative of a loading of the power transfer signal by the power receiver.

As a low complexity example, the power receiver may regularly transmit messages of the value of the load $Z_L$ and the power transmitter may directly use this value as the load indication, i.e. it may directly set the maximum limit dependent on the value of the load (e.g. based on data stored in a look-up table).

The power transmitter may then adapt the current and/or power limit based on the load data received from the power receiver. For example, for the parameters of FIG. 6, the power transmitter may set the coil current limit to 1.2 A at load impedance $Z_L=800\Omega$ and to 3 A at a load impedance $Z_L=10\Omega$.

Figure 20:
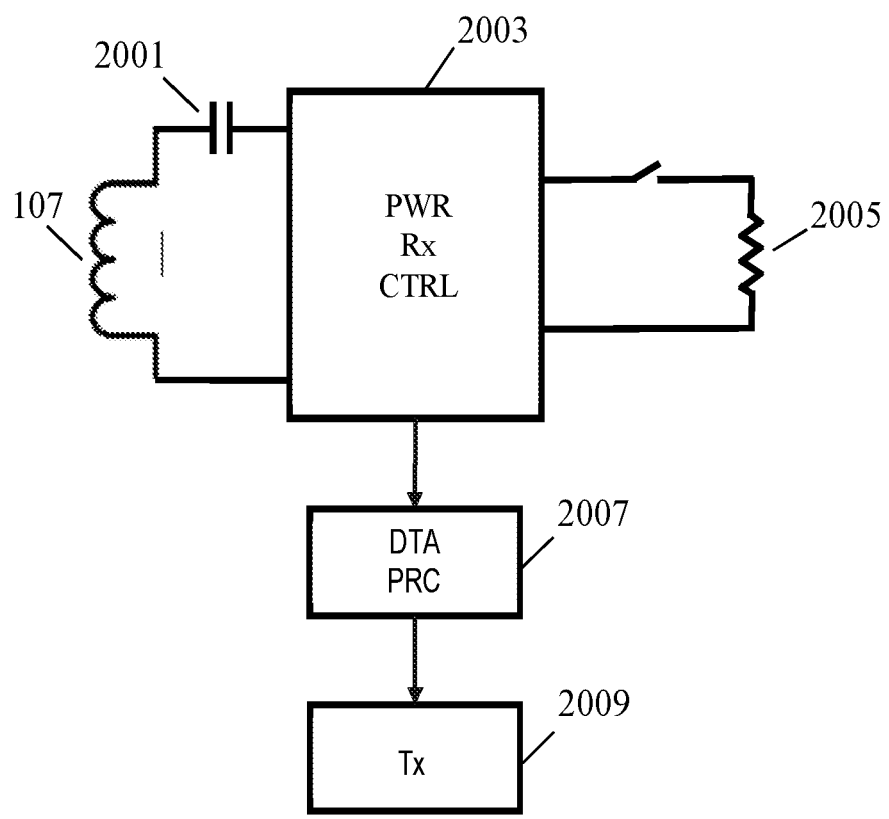
FIG. 20 illustrates an example of some elements of a power receiver for a wireless power transfer system in accordance with some embodiments of the invention.

An example of elements of a power receiver 105 arranged to provide load data to the power transmitter 101 is illustrated in FIG. 20. The power receiver 105 comprises the power receiver coil 107 and a receiver capacitor 2001 which is coupled in series to provide a receive resonance circuit. The receive resonance circuit is coupled to a power receiver controller 2003 which comprises the various functionality for the operation of the power receiver 105 including voltage conversion, control etc. The power receiver controller 2003 is further coupled to an external load 2005 corresponding to the load $Z_L$. The operation of these elements may substantially correspond to the operation in conventional power receivers as is known to the skilled person. It may employ the approaches previously described with reference to FIGS. 1 and 2.

The power receiver 105 further comprises a data generator 2007 which is arranged to generate the load data reflecting the loading of the power receiver, and specifically in many embodiments directly indicating the value of the load $Z_L$.

The data generator 2007 is coupled to a transmitter 2009 which is arranged to transmit load messages comprising the load data to the power transmitter. The messages comprising the load data may be transmitted in the same way as the power control error messages, i.e. they may be communicated using load modulation and they may e.g. be communicated periodically. Indeed, in some embodiments, load data may be appended to power control error messages.

In some embodiments, the data generator 2007 may be arranged to determine the loading of the power receiver in response to a measurement of the load current, the load voltage, or indeed both the load current and load voltage for the load of the power receiver.

For example, the power receiver controller 2003 may comprise functionality for measuring the voltage over and current through the load 2005. These values may be fed to the data generator 2007 which proceeds to calculate either the power (by multiplying the values) or the impedance (by dividing the voltage by the current) and to forward this to the transmitter 2009 for transmission to the power transmitter 101.

In other embodiments, the data generator 2007 may be arranged to transmit the load voltage and/or current to the power transmitter 101 which may then proceed to generate e.g. the power or impedance values. These may then be used as the load indication.

Thus, in some embodiments, the functionality for calculating the load indication may be in the power transmitter 101 whereas it in other embodiments may be in the power receiver 105.

The power receiver 105 may for example transmit information on the load impedance $Z_L$ to the power transmitter 101 using a data packet structured as shown in FIG. 21 (where the impedance value is provided in ohms). Alternatively (or additionally), a data packet as illustrated in FIG. 22 may be used to indicate the load voltage and current. The data values may be converted to current and voltage values using the relationships:

$$u_L = \text{Load Voltage} \times 2^{\text{Voltage Exponent}} \text{ in millivolts.}$$

$$i_L = \text{Load Current} \times 2^{\text{Current Exponent}} \text{ in milliamperes.}$$

The Ack bit in these data packets indicate whether the power receiver requests an acknowledge response from the power transmitter (ONE) or not (ZERO). The data packet format of FIG. 21 is shorter, but requires the power receiver to calculate the load impedance. The data packet of FIG. 22 shifts the calculation effort of the load impedance from the power receiver to the power transmitter.

In some embodiments, the transmitter 2009 may be arranged to transmit a load message to the power transmitter in response to a detection that a change in the load of the power receiver meets a power change load criterion. The power change load criterion may for example be that the load has changed by more than a given amount from the last load that was reported or may e.g. indicate that the load crosses a threshold. It will be appreciated that the exact criterion for when to transmit a load message may depend on the individual embodiment.

The message may indicate that the criterion has been met but may in some embodiments not include a specific load value. The adapter 1309 may then proceed to adapt the maximum limit based on the received message. For example, the message may simply indicate that the load has changed to fall into a different category and the adapter 1309 may adapt e.g. the current limit to reflect the typical operating characteristics for this specific category.

For example, the power receiver may send a packet to the power transmitter to indicate whether or not the load is above or below a threshold reflecting whether it is safe to use a higher current limit or not. For example, if the power receiver has not connected the external load, the impedance looking into its coil is typically high, and an over-voltage situation can easily occur. However, if the power receiver has connected the external load then the impedance looking into its coil may be sufficiently low for an over voltage situation not to occur easily. The load data may simply indicate whether the external load is connected or not, and the transmitter 2009 may be arranged to transmit a load message when the load is connected or disconnected. More specifically, a power receiver may e.g. send a packet to the power transmitter both when the impedance looking into its coil drops below, e.g. 15Ω, and when this impedance rises to a level above 15Ω. The power transmitter may then e.g. switch the maximum limit between two predetermined values depending on whether information is received indicating that the load is disconnected or whether it indicates that the load is connected.

As a specific example, the power transmitter may initially set its current and power limits to levels that are appropriate for a basic Qi power profile device corresponding to a transmitter that can transmit up to about 5 W of power. For these limits, the system may be such that an over-voltage is ensured to not exceed the desired $u_L$=20 V value. Since the power transmitter cannot provide more than about 5 W of power, the power receiver may then first use the power control loop to establish an intermediate operating point at a power level restricted by the basic power profile (i.e. with a power less than 5 W). After it has reached this intermediate operating point, the power receiver may communicate to the power transmitter that the load impedance has reached a value below a critical threshold (e.g. $Z_L$<15Ω). The power transmitter may in response to receiving load data indicating that the load impedance is below the threshold adjust the current and power limits to levels that are appropriate for a Qi extended power profile providing higher power levels. It may further optionally confirm the new limits to the power receiver by sending an ACK response. The power receiver can subsequently increase its power demand to the intended operating point.

If the power receiver's load impedance $Z_L$ subsequently increases to exceed the critical level ($Z_L$>15Ω), the power receiver generates a new load message indicating such and transmits it to the power transmitter. In response to receiving this, the power transmitter reduces the limits back to the basic power profile limits.

In some embodiments, instead of just informing the power transmitter when a load threshold is crossed, the power receiver may transmit information to the power transmitter indicating the value of a suitable threshold and then proceed to regularly transmit simple load messages indicating a current load. The power transmitter may then compare the received values to the received threshold and set the limits accordingly. Thus, with this approach, the comparison effort is shifted from the power receiver to the power transmitter.

Once every second or every few seconds may often be an appropriate update rate for load information being transmitted to the power transmitter for use in controlling the limits. Thus, the update rate is typically lower than for the power control loop.

In some embodiments wherein the limits are determined in response to messages from the power receiver, the power transmitter may also be arranged to autonomously adapt the maximum limit(s) in response to a detection of a change in the loading of the power transfer signal/a change in the power of the drive signal.

For example, if the system is operating at the desired operating point of 12V and 1.5 A, the power limit may be set to, say, 20 W and the current limit to, say, 3 A. Furthermore, the driver 1303 may be outputting around 19 W (i.e. 1 W is lost in parasitic losses). The power receiver may transmit a load message every 2 seconds. However, the power adapter 1309 may continuously monitor the power of the drive signal and if this suddenly drops to, say, 2 W, it is likely that a sudden and drastic change in the loading of the power receiver may have occurred. For example, a user may simply have removed or switched off the external load of the power receiver.

However, the power transmitter will not be informed of this until the next load message is received which as a worst case may not be for another 2 seconds. If the user further moves the power receiver to increase the coupling, an over-voltage condition may arise and this may not be effectively mitigated by the current high limits. This could potentially cause damage e.g. to the circuitry of the power receiver.

However, in the example, the adapter 1309 may quickly detect the reduced power level and proceed to immediately reduce the levels. For example, the moment a drastic power change is detected, the adapter 1309 may adjust the levels accordingly. In the specific example, the adapter 1309 may in response to a detection of the change in the power of the drive signal proceed to instantly reduce the limits to e.g. 3 W and 1.5 A. The adapter 1309 may then wait for the next load message (or load messages) and then adapt the limits in response to these. Thus, in some examples the power transmitter may implement an independent and very fast adaptation of the limits.

As another example, based on the information received from the power receiver relating to the load voltage and current, the corresponding operating parameters for the transmitter may be determined. Thus, a relationship between the received load indication and the power transmitter parameters (specifically the properties of the drive signal) may be established during normal operation. For example, the drive signal properties for a 5 W, 10 W and 15 W loading may be established and stored in a look-up table. Further, suitable limits may be identified for the different operating points and stored in the look-up table.

In case the power receiver suddenly changes its load, this change may be detected at the power transmitter before the power receiver provides any information of the change. In response, the power transmitter may identify one of the stored operating points considered to most closely reflect the detected current conditions. It may then retrieve the stored operating values for this operating point and apply them, including the stored limits.

Thus, such approaches may allow accurate operation based on information from the power receiver while still allowing the power transmitter to react very quickly to sudden load changes thereby reducing the risk of any over-voltage conditions.

In the described examples, the magnetic fields strength, and thus the strength of the power transfer signal, has been limited by an adaptive limit. The magnetic field strength depends directly on the current through the transmitter coil 103 and description has focused on examples wherein the current of the transmitter coil has been limited using an adaptive limit.

The limitation of the current may be performed directly or indirectly. For example, a current limiter may be introduced directly in series with the transmitter coil. A more indirect approach may be to limit the drive signal current by controlling the operating parameters for the driver, such as by controlling the duty cycle, drive signal frequency, driver output circuit voltage or the input current to the driver. In the example, where the transmitter coil is in series with the capacitor and the driver (i.e. the resonance circuit is a series resonance circuit coupled directly to the output of the driver and with no other parallel current paths), the drive current (the output current from the driver) is the same as the transmitter coil current, and thus controlling and limiting the driver current is also a direct control and limit of the transmitter coil current.

Similarly, the determination of the transmitter coil current in order to determine whether this exceeds the limit or not may be performed directly or indirectly. For example, this may be achieved by a current sense directly sensing the current through the transmitter coil (for example by a current sense providing an output which is a function of the magnetic field strength (e.g. by a measurement coil positioned proximal to the transmitter coil)). Such an approach may be particularly efficient for scenarios where the transmitter coil current is not the same as the drive current, such as for example if the resonance circuit is a parallel resonance circuit or if there are parallel current paths for the output of the driver.

In other embodiments, an indirect measurement of the transmitter coil current may be applied, such as e.g. by measuring the input current to the driver output circuit.

It will also be appreciated that in many embodiments, the limitation and measurement may be integrated. For example, the transmitter coil current may be measured and limited by the system imposing an adjustable current limit for the input supply to the driver output circuit. In other embodiments, different properties may be evaluated and controlled. For example, for a parallel resonance circuit, the current through the transmitter coil may directly be sensed by a separate current sense coil and based on this value a limit on the input current to the driver output circuit may be imposed.

Thus, in order to limit the power transfer signal strength, the coil current is the parameter that is limited. To do so, other related parameters can be measured and/or limited, such as e.g. the coil voltage or the voltage of the resonance capacitor. Although the drive current into the resonance circuit will influence the coil current, the relation between this and the coil current may heavily depend on other parameters in some embodiments (such as e.g. the operating frequency). In particular, if the resonance capacitor is in parallel with the transmitter coil, it requires only a very small driving current to achieve a high coil current when the quality factor of the resonance circuit is high and the drive frequency corresponds to the resonance frequency. In particular, for such embodiments, it may for example be advantageous to directly measure the transmitter coil current and e.g. to limit it by reducing e.g. the drive signal voltage if the measured current exceeds the limit.

It will also be appreciated that different measures for e.g. the current may be used. For example, the current limit may be a limit for an average, amplitude or RMS current value. The current and/or power values are thus typically values that reflect the whole cycle and which does not vary due to variations within a single cycle. The values represent the properties of the entire cycle and are typically values averaged over at least one cycle (of the drive signal/resonance circuit).

In consluiong the main described approaches are directed to power control in a wireless power transfer system. Power control messages are received from a power receiver and the power of the power transfer signal is adapted according to these messages. However, rather than a conventional power loop, the approach further introduces a constraint on this adaptation in response to the power messages by the power controller performing the adaptation subject to the power being below a maximum limit. Thus, the power controller can adapt and modify the power of the power transfer signal but is bounded by the maximum limit. Thus, the power control adaptation is simultaneously subject to two considerations, namely the received power control messages and the maximum limit.

Further, the maximum limit is not a constant or fixed limit but rather is adapted in response to the loading of the power transfer signal by the power receiver. Thus, the maximum limit imposed on the power of the power transfer signal as controlled by the power control loop is adjusted based on the loading of the power transfer signal (and thus is related to the power of the power transfer signal).

The approach provides a very flexibly power control in a wireless power transfer signal wherein the power control can both provide a very flexible and accurate power control that covers a very large dynamic range yet at the same time prevent over voltage conditions that are experienced in traditional systems when e.g. the coupling factor is quickly changes e.g. due to the power receiver being moved.

The approach may in particular provide a power control approach where power control is freely available in a large dynamic range while at the same time ensuring that a safety limit is imposed to prevent damaging over-voltage conditions occurring. Significantly, the approach allows the safety limit to within the dynamic range covered by the power control and thus allows it to be very close to the current operating point which in practice is necessary in order to prevent potentially damaging over voltage conditions. The approach provides a solution to the conflicting problems of how to prevent over-voltage conditions in case of sudden changes in the coupling factor and how to provide efficient power control over a very large dynamic range.

It will be appreciated that the above description for clarity has described embodiments of the invention with reference to different functional circuits, units and processors. However, it will be apparent that any suitable distribution of functionality between different functional circuits, units or processors may be used without detracting from the invention. For example, functionality illustrated to be performed by separate processors or controllers may be performed by the same processor or controllers. Hence, references to specific functional units or circuits are only to be seen as references to suitable means for providing the described functionality rather than indicative of a strict logical or physical structure or organization.

The invention can be implemented in any suitable form including hardware, software, firmware or any combination of these. The invention may optionally be implemented at least partly as computer software running on one or more data processors and/or digital signal processors. The elements and components of an embodiment of the invention may be physically, functionally and logically implemented in any suitable way. Indeed the functionality may be implemented in a single unit, in a plurality of units or as part of other functional units. As such, the invention may be implemented in a single unit or may be physically and functionally distributed between different units, circuits and processors.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term comprising does not exclude the presence of other elements or steps.

Furthermore, although individually listed, a plurality of means, elements, circuits or method steps may be implemented by e.g. a single circuit, unit or processor. Additionally, although individual features may be included in different claims, these may possibly be advantageously combined, and the inclusion in different claims does not imply that a combination of features is not feasible and/or advantageous. Also the inclusion of a feature in one category of claims does not imply a limitation to this category but rather indicates that the feature is equally applicable to other claim categories as appropriate. Furthermore, the order of features in the claims do not imply any specific order in which the features must be worked and in particular the order of individual steps in a method claim does not imply that the steps must be performed in this order. Rather, the steps may be performed in any suitable order. In addition, singular references do not exclude a plurality. Thus references to "a", "an", "first", "second" etc do not preclude a plurality. Reference signs in the claims are provided merely as a clarifying example shall not be construed as limiting the scope of the claims in any way.

The invention claimed is:

1. A power transmitter comprising:
   a resonance circuit,
   wherein the resonance circuit comprises a capacitive impedance and an inductive impedance,
   wherein the inductive impedance comprises a transmitter coil,
   wherein the transmitter coil is configured to generate a power transfer signal,
   wherein the power transfer signal is configured to wirelessly transfer power to a power receiver;
   a driver circuit, wherein the driver circuit is configured to generate a drive signal for the resonance circuit;
   a message receiver, wherein the message receiver is configured to receive at least one message from the power receiver;
   a power loop control circuit,
   wherein the power loop control circuit is configured to change a power of the drive signal in response to the at least one message received from the power receiver during a wireless power transfer phase,
      wherein the power loop control circuit is configured to change the power of the drive signal while maintaining a power parameter below a maximum limit,
      wherein the power parameter comprises at least one of a current of the resonance circuit, a voltage of the resonance circuit, and the power of the drive signal; and
   an adapter circuit coupled to the message receiver and the power loop control circuit,
      wherein the adapter circuit is configured to change the maximum limit in response to a load indication,
      wherein the load indication is determined by the power transmitter based on a change in power of the drive signal due to the influence of a load of the power receiver on the resonant circuit during the wireless power transfer phase, and
   wherein the load indication is determined by the power transmitter independently from messages received by the power transmitter from the power receiver.

2. The power transmitter of claim 1, wherein the adapter circuit is configured to dynamically change the maximum limit to reflect variations in the loading of the power transfer signal during the wireless power transfer phase.

3. The power transmitter of claim 1,
   wherein the driver circuit is configured to determine a power indication,
   wherein the power indication indicates the power of the drive signal,
   and wherein the adapter circuit is configured to determine the load indication as a function of the power indication.

4. The power transmitter of claim 1, wherein the power loop control circuit is configured to limit at least one of a current of the drive signal and a voltage of the drive signal.

5. The power transmitter of claim 1, wherein the power loop control circuit is configured to limit at least one of a current of the transmitter coil and a voltage of the transmitter coil.

6. The power transmitter of claim 1,
wherein the maximum limit is a monotonically increasing function of a power loading by the power receiver,
wherein the power loading is indicated by the load indication.

7. The power transmitter of claim 1, wherein the adapter circuit is configured to increase the maximum limit above a first threshold only if the load indication is indicative of the power of the drive signal being above a second threshold.

8. The power transmitter of claim 1,
wherein the adapter circuit is configured to adapt the maximum limit of both a current maximum limit for the current of the resonance circuit and a power maximum limit for the power of the drive signal,
and wherein the power loop control circuit is configured to change the power of the drive signal subject to both the current of the resonance circuit being below the current maximum limit and the power of the drive signal being below the power maximum limit.

9. The power transmitter of claim 1,
wherein the adapter circuit is configured to determine the load indication based on load data received in the at least one message,
wherein the load data is indicative of a loading of the power transfer signal.

10. The power transmitter of claim 9, wherein the adapter circuit is configured to change the maximum limit in response to a detection of a change in a loading of the power transfer signal by the power receiver.

11. The power transmitter of claim 1, further comprising a memory,
wherein the memory is configured to store the maximum limit for each of a first power profile and a second power profile,
wherein the maximum limit of the second wireless power profile is a multiple of the maximum limit of the first wireless power profile,
wherein the power loop control circuit is configured to determine a load indication indicative of a loading of the power transfer signal which exceeds the maximum limit of the first wireless power profile,
wherein the adapter circuit is configured to change the maximum limit to correspond to the maximum limit stored in memory for the second wireless power profile.

12. A wireless power transfer system comprising:
a power receiver and a power transmitter,
wherein the power transmitter comprises:
a resonance circuit,
wherein the resonance circuit comprises a capacitive impedance and an inductive impedance,
wherein the inductive impedance comprises a transmitter coil,
wherein the transmitter coil is configured to generate a power transfer signal,
wherein the power transfer signal is configured to wirelessly transfer power to a power receiver;
a driver circuit, wherein the driver circuit is configured to generate a drive signal for the resonance circuit,
a message receiver, wherein the message receiver is configured to receive at least one message from the power receiver,
a power loop control circuit,
wherein the power loop control circuit is configured to change a power of the drive signal in response to the at least one message received from the power receiver during a wireless power transfer phase,
wherein the power loop control circuit is configured to change the power of the drive signal while maintaining a power parameter below a maximum limit,
wherein the power parameter comprises at least one of a current of the resonance circuit, a voltage of the resonance circuit, and a power of the drive signal; and
an adapter circuit coupled to the message receiver and the power loop control circuit,
wherein the adaptor circuit is configured to change the maximum limit in response to a load indication,
wherein the load indication is determined by the power transmitter based on the change in power of the drive signal due to the influence of a load of the power receiver during the wireless power transfer phase;
wherein the load indication is determined by the power transmitter independently from messages received by the power transmitter from the power receiver;
the power receiver comprising:
a data generator,
wherein the data generator is configured to generate load data,
wherein the load data reflects a loading of the power receiver; and
a communication transmitter,
wherein the communication transmitter is configured to transmit at least one message to the power transmitter,
wherein the at least one message comprises the load data.

13. The wireless power transfer system of claim 12, wherein the data generator is configured to determine the loading of the power receiver in response to at least one of a measurement of a load current for a load of the power receiver and a measurement of a load voltage for the load of the power receiver.

14. The wireless power transfer system of claim 12,
wherein the communication transmitter is configured to transmit the at least one message to the power transmitter in response to a detection that a change in a load of the power receiver meets a power change load criterion,
wherein the load data of the at least one message is indicative of the change meeting the power change load criterion, and
wherein the adapter circuit is configured to change the maximum limit in response to detecting that the at least one message comprises load data indicative of the change meeting the power change load criterion.

15. The wireless power transfer system of claim 12,
wherein the power transmitter comprises a memory,
wherein the memory is configured to store the maximum limit for each of a first power profile and a second power profile,
wherein the maximum limit of the second wireless power profile is a multiple of the maximum limit of the first wireless power profile, wherein the power loop control circuit is configured to determine a load indication indicative of a loading of the power transfer signal which exceeds the maximum limit of the first wireless power profile,
wherein the adapter circuit is configured to change the maximum limit to correspond to the maximum limit for the second wireless power profile.

16. A method of operating a power transmitter, wherein the power transmitter comprises an adapter circuit coupled to a message receiver and a power loop control circuit, and wherein the power transmitter further comprises a resonance circuit, wherein the resonance circuit has a capacitive impedance and an inductive impedance, wherein the inductive impedance comprises a transmitter coil, wherein the transmitter coil is configured to generate a power transfer signal, wherein the power transfer signal is configured to transfer power to a power receiver, the method comprising:
generating a drive signal for the resonance circuit;
receiving, at the message receiver, at least one message from the power receiver during a wireless power transfer phase;
adjusting, by the power loop control circuit, a power of the drive signal in response to the at least one message received from the power receiver,
wherein the adapting is subject to maintaining a power parameter below a maximum limit,
wherein the power parameter comprises at least one of a current of the resonance circuit, a voltage of the resonance circuit, and the power of the drive signal;
determining a load indication, wherein the load indication is determined by the power transmitter based on the change in power of the drive signal due to the influence of a load of the power receiver on the resonant circuit during the wireless power transfer phase; and
adapting, by the adapter circuit, the maximum limit in response to the load indication;
wherein the load indication is determined by the power transmitter independently from messages received by the power transmitter from the power receiver.

17. The method of claim 16, further comprising increasing the maximum limit above a first threshold if the load indication is indicative of a power of the drive signal above a second threshold.

18. The method of claim 16,
wherein the maximum limit includes both a current maximum limit and a power maximum limit,
wherein the current maximum limit is the current of the resonance circuit,
wherein the power maximum limit is the power of the drive signal,
the method further comprising adapting both the current of the resonance circuit to remain below a current maximum limit and the power of the drive signal to remain below a power maximum limit.

19. The method of claim 16, further comprising:
storing the maximum limit in a memory for each of first wireless power profile and a second wireless power profile,
wherein the maximum limit of the second wireless power profile is a multiple of the maximum limit of the first wireless power profile;
adapting a power of the drive signal to remain below the maximum limit of the first wireless power profile;
determining a load indication, wherein the load indications indicates a loading of the power transfer signal which exceeds the maximum limit of the first wireless power profile; and
changing the maximum limit to correspond to the maximum limit of the second wireless power profile.

* * * * *